United States Patent
Li et al.

(10) Patent No.: US 12,420,835 B2
(45) Date of Patent: Sep. 23, 2025

(54) VEHICLE DRIVING INTENTION PREDICTION METHOD, APPARATUS, AND TERMINAL, AND STORAGE MEDIUM

(71) Applicant: Shenzhen Yinwang Intelligent Technologies Co., Ltd., Shenzhen (CN)

(72) Inventors: Fei Li, Shenzhen (CN); Shiwei Fan, Beijing (CN); Xiangxu Li, Shenzhen (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 18/456,681

(22) Filed: Aug. 28, 2023

(65) Prior Publication Data

US 2023/0399023 A1   Dec. 14, 2023

Related U.S. Application Data

(63) Continuation of application No. PCT/CN2021/078239, filed on Feb. 26, 2021.

(51) Int. Cl.
  *G06N 3/044* (2023.01)
  *B60W 30/18* (2012.01)
  (Continued)

(52) U.S. Cl.
  CPC .. *B60W 60/0015* (2020.02); *B60W 30/18154* (2013.01); *B60W 30/18163* (2013.01); *B60W 50/0097* (2013.01); *G06N 3/044* (2023.01); *B60W 2552/53* (2020.02); *B60W 2556/35* (2020.02); *B60W 2556/40* (2020.02)

(58) Field of Classification Search
  CPC ....... B60W 60/0015; B60W 30/18154; B60W 30/18163; B60W 50/0097; B60W 2552/53; B60W 2556/35; B60W 2556/40; B60W 30/18159; B60W 2552/10;
  (Continued)

(56) References Cited

U.S. PATENT DOCUMENTS 9,248,834 B1   2/2016   Ferguson et al.

FOREIGN PATENT DOCUMENTS

| CN | 110060467 A | 7/2019 |
|----|-------------|--------|
| CN | 110400490 A | 11/2019 |
| CN | 110796856 A | 2/2020 |

OTHER PUBLICATIONS

Qianxia Cao et al:"Real-Time Vehicle Trajectory Prediction for Traffic Conflict Detection at Unsignalized Intersections." Journal of Advanced Transportation vol. 2021, Article ID 8453726. Dec. 20, 2021. total 15 pages.

(Continued)

*Primary Examiner* — Ashley L Redhead, Jr.
(74) *Attorney, Agent, or Firm* — Conley Rose, P.C.

(57) ABSTRACT

A vehicle driving intention prediction method includes that a road intention and a lane intention of a target vehicle are determined based on a driving feature of a surrounding vehicle relative to the target vehicle, a driving feature of the target vehicle relative to a road, and a driving feature of the target vehicle relative to a lane, and then a driving intention of the target vehicle is determined based on the road intention and the lane intention of the target vehicle. The driving intention of the target vehicle is determined by predicting a multi-level intention, for example, the lane intention or the road intention, of the target vehicle.

20 Claims, 10 Drawing Sheets

(51) Int. Cl.
*B60W 50/00*        (2006.01)
*B60W 60/00*        (2020.01)

(58) Field of Classification Search
CPC . B60W 60/00274; G06N 3/044; G06N 3/045;
G08G 1/09626; G08G 1/166
See application file for complete search history.

(56) References Cited

OTHER PUBLICATIONS

Kecheng Xu et al:"Data Driven Prediction Architecture for Autonomous Driving and its Application on Apollo Platform", arXiv:2006.06715v1 [cs.RO] Jun. 11, 2020, total 7 pages.

VEHICLE DRIVING INTENTION PREDICTION METHOD, APPARATUS, AND TERMINAL, AND STORAGE MEDIUM

CROSS-REFERENCE TO RELATED APPLICATIONS

This is a continuation of International Patent Application No. PCT/CN2021/078239 filed on Feb. 26, 2021, the disclosure of which is hereby incorporated by reference in its entirety.

TECHNICAL FIELD

This application relates to the autonomous driving field, furthermore, to a vehicle driving intention prediction method, apparatus, and terminal, and a storage medium.

BACKGROUND

People usually need to predict events in the future, for example, predict weather of tomorrow, and a harvest. Likewise, people also subconsciously predict a driving intention of another vehicle (namely, future driving behavior of the another vehicle, for example, braking, lane change, acceleration, going straight, turning left, turning right, or turning around) when driving, to determine a driving route of the vehicle based on the driving intention of the another vehicle. This can avoid a possible danger to some extent.

With progress and development of science and technology, people start to study a vehicle autonomous driving technology that can be applied to the autonomous driving field such that a vehicle can implement autonomous driving, thereby releasing people's hands. To implement autonomous driving, the vehicle not only needs to automatically start, drive, brake, park, and the like, but also needs to simulate predicted behavior of a human in a driving process, to accurately identify a driving intention of a surrounding target vehicle. This can adjust a driving route based on the driving intention of the surrounding target vehicle, and reduce a probability of a traffic accident.

In a non-intersection scenario, the driving intention of the vehicle is easy to predict because there is a physical lane line on a road to restrict the vehicle. In an intersection scenario, a behavior difference of the vehicle is more obvious because a road structure is complex and changeable and there is no specific physical lane driving line constraint. Because structures of different intersections vary greatly, it is difficult to accurately describe the behavior intention of the target vehicle with a fixed-type semantic intention, such as going straight, turning left, turning right, or turning around. In addition, a virtual lane in a high-definition map may be missing or inaccurate. Therefore, it is particularly difficult to accurately predict the driving intention of the vehicle in the intersection scenario.

SUMMARY

Embodiments of this application provide a vehicle driving intention prediction method, apparatus, and terminal, and a storage medium, to resolve a problem of vehicle driving intention prediction in an intersection scenario.

According to a first aspect, an embodiment of this application provides a vehicle driving intention prediction method includes that when a target vehicle drives to an intersection, obtaining map information of the intersection, where the map information of the intersection includes road layer information and lane layer information, the road layer information includes a plurality of roads connected to the intersection, the lane layer information includes a plurality of lanes, and the lanes are some segments connected to the roads in the intersection; obtaining driving information of the target vehicle; determining a driving feature of the target vehicle relative to each of the plurality of lanes based on the driving information of the target vehicle and the lane layer information; determining a driving feature of the target vehicle relative to each of the plurality of roads based on the driving information of the target vehicle and the road layer information; determining at least a lane intention of the target vehicle based on a driving feature of a surrounding vehicle relative to the target vehicle, the driving feature of the target vehicle relative to each of the plurality of roads, and the driving feature of the target vehicle relative to each of the plurality of lanes, where the surrounding vehicle is a vehicle in a preset range of the target vehicle, and the lane intention of the target vehicle represents a probability distribution that the target vehicle drives away from the intersection through each of the plurality of lanes; and determining a driving intention of the target vehicle based on at least the lane intention of the target vehicle.

The determining at least a lane intention of the target vehicle based on a driving feature of a surrounding vehicle relative to the target vehicle, the driving feature of the target vehicle relative to each of the plurality of roads, and the driving feature of the target vehicle relative to each of the plurality of lanes includes determining a road intention of the target vehicle and the lane intention of the target vehicle based on the driving feature of the surrounding vehicle relative to the target vehicle, the driving feature of the target vehicle relative to each of the plurality of roads, and the driving feature of the target vehicle relative to each of the plurality of lanes, where the road intention of the target vehicle represents a probability distribution that the target vehicle drives away from the intersection through each of the plurality of roads; and determining a driving intention of the target vehicle based on at least the lane intention of the target vehicle includes determining the driving intention of the target vehicle based on the road intention of the target vehicle and the lane intention of the target vehicle.

In this embodiment of this application, the road intention and the lane intention of the target vehicle are determined based on the driving feature of the surrounding vehicle relative to the target vehicle, the driving feature of the target vehicle relative to the road, and the driving feature of the target vehicle relative to the lane, and then the driving intention of the target vehicle is determined based on the road intention and the lane intention of the target vehicle. The driving intention of the target vehicle is determined by predicting a multi-level intention (namely, the lane intention and the road intention) of the target vehicle. This can effectively and accurately represent driving behavior of the target vehicle, and can adapt to scenarios of intersections of different structures, thereby avoiding an inaccurate and vague description of the driving behavior of the target vehicle by a predefined fixed-type intention (for example, turning left, turning right, or turning around).

In a possible implementation, determining a road intention of the target vehicle and the lane intention of the target vehicle based on the driving feature of the surrounding vehicle relative to the target vehicle, the driving feature of the target vehicle relative to each of the plurality of roads, and the driving feature of the target vehicle relative to each of the plurality of lanes includes inputting a driving feature of each of the surrounding vehicles relative to the target vehicle into a first interaction feature extraction network, to determine an interaction feature vector between the surrounding vehicle and the target vehicle, where the interaction feature vector between the surrounding vehicle and the target vehicle represents impact of the surrounding vehicle on the target vehicle; inputting the interaction feature vector between the surrounding vehicle and the target vehicle, the driving feature of the target vehicle relative to each of the plurality of lanes, and the driving feature of the target vehicle relative to a road associated with each of the plurality of lanes into a lane intention prediction network, to determine the lane intention of the target vehicle and a driving feature implicit vector of the target vehicle relative to each of the plurality of lanes; and inputting the driving feature of the target vehicle relative to each of the plurality of roads, the driving feature implicit vector that is of the target vehicle relative to each of the plurality of lanes and that corresponds to the plurality of lanes associated with each of the plurality of roads, and the lane intention, of the target vehicle, corresponding to a lane associated with each of the plurality of roads into a road intention prediction network, to determine the road intention of the target vehicle.

In this embodiment of this application, when the lane intention of the target vehicle is predicted, not only the driving feature of the target vehicle relative to the lane is considered, but also the driving feature of the surrounding vehicle relative to the target vehicle and driving features of the target vehicle relative some roads are considered. When the road intention of the target vehicle is predicted, not only the driving feature of the target vehicle relative to the road is considered, but also driving features of the target vehicle relative to some lanes are considered. Precision, and generalization of the solution and robustness to noise are improved.

In another possible implementation, the first interaction feature extraction network includes at least a plurality of first feature extraction subnetworks and an interaction feature vector prediction network; and the inputting a driving feature of each of the surrounding vehicles relative to the target vehicle into a first interaction feature extraction network, to determine an interaction feature vector between the surrounding vehicle and the target vehicle includes inputting the driving feature of each of the surrounding vehicles relative to the target vehicle into the plurality of first feature extraction subnetworks, to determine a driving feature vector of each of the surrounding vehicles relative to the target vehicle; and inputting the driving feature vector of each of the surrounding vehicles relative to the target vehicle into the interaction feature vector prediction network, to determine the interaction feature vector between the surrounding vehicle and the target vehicle.

In another possible implementation, the lane intention prediction network includes at least a first lane feature extraction subnetwork, a second lane feature extraction subnetwork, a first road feature extraction subnetwork, a second road feature extraction subnetwork, and a lane intention prediction subnetwork; and the inputting the interaction feature vector between the surrounding vehicle and the target vehicle, the driving feature of the target vehicle relative to each of the plurality of lanes, and the driving feature of the target vehicle relative to a road associated with each of the plurality of lanes into a lane intention prediction network, to determine the lane intention of the target vehicle and a driving feature implicit vector of the target vehicle relative to each of the plurality of lanes includes inputting the driving feature of the target vehicle relative to each of the plurality of lanes into the first lane feature extraction subnetwork, to determine a driving feature vector of the target vehicle relative to each of the plurality of lanes; inputting the driving feature vector of the target vehicle relative to each of the plurality of lanes into the second lane feature extraction subnetwork, to determine the driving feature implicit vector of the target vehicle relative to each of the plurality of lanes; inputting the driving feature of the target vehicle relative to the road associated with each of the plurality of lanes into the first road feature extraction subnetwork, to determine a driving feature vector of the target vehicle relative to the road associated with each of the plurality of lanes; inputting the driving feature vector of the target vehicle relative to the road associated with each of the plurality of lanes into the second road feature extraction subnetwork, to determine a driving feature implicit vector of the target vehicle relative to the road associated with each of the plurality of lanes; and inputting the interaction feature vector between the surrounding vehicle and the target vehicle, the driving feature vector of the target vehicle relative to each of the plurality of lanes, the driving feature implicit vector of the target vehicle relative to each of the plurality of lanes, and the driving feature implicit vector of the target vehicle relative to the road associated with each of the plurality of lanes into the lane intention prediction subnetwork, to determine the lane intention of the target vehicle.

In another possible implementation, the inputting the driving feature vector of the target vehicle relative to each of the plurality of lanes into the second lane feature extraction subnetwork, to determine the driving feature implicit vector of the target vehicle relative to each of the plurality of lanes includes extracting, by a plurality of feature extraction windows in the second lane feature extraction subnetwork, the driving feature vector of the target vehicle relative to each of the plurality of lanes in an order of driving moments; and determining the driving feature implicit vector of the target vehicle relative to each of the plurality of lanes based on an implicit vector output by a previous feature extraction window and a driving feature vector that is of the target vehicle relative to each of the plurality of lanes and that corresponds to a current feature extraction window.

In another possible implementation, the inputting the driving feature vector of the target vehicle relative to the road associated with each of the plurality of lanes into the second road feature extraction subnetwork, to determine a driving feature implicit vector of the target vehicle relative to the road associated with each of the plurality of lanes includes extracting, by a plurality of feature extraction windows in the second road feature extraction subnetwork, the driving feature vector of the target vehicle relative to the road associated with each of the plurality of lanes in an order of driving moments; and determining the driving feature implicit vector of the target vehicle relative to the road associated to each of the plurality of lanes based on an implicit vector output by a previous feature extraction window and a driving feature vector that is of the target vehicle relative to the road associated to each of the plurality of lanes and that corresponds to a current feature extraction window.

In another possible implementation, the road intention prediction network includes at least the first road feature extraction subnetwork, the second road feature extraction subnetwork, and a road intention prediction subnetwork; and the inputting the driving feature of the target vehicle relative to each of the plurality of roads, the driving feature implicit vector that is of the target vehicle relative to each of the plurality of lanes and that corresponds to the plurality of lanes associated with each of the plurality of roads, and the lane intention, of the target vehicle, corresponding to a lane associated with each of the plurality of roads into a road intention prediction network, to determine the road intention of the target vehicle includes inputting the driving feature of the target vehicle relative to each of the plurality of roads into the first road feature extraction subnetwork, to determine a driving feature vector of the target vehicle relative to each of the plurality of roads; inputting the driving feature vector of the target vehicle relative to each of the plurality of roads into the second road feature extraction subnetwork, to determine a driving feature implicit vector of the target vehicle relative to each of the plurality of roads; performing, based on the lane intention corresponding to the lane associated with each of the plurality of roads, weighted processing on the driving feature implicit vector that is of the target vehicle relative to each of the plurality of lanes and that corresponds to the lane associated with each of the plurality of roads, and splicing weighted processing results, to obtain an implicit fusion vector of the lane associated with each of the plurality of roads; and inputting the driving feature vector of the target vehicle relative to each of the plurality of roads and the implicit fusion vector of the lane associated with each of the plurality of roads into the road intention prediction subnetwork, to determine the road intention of the target vehicle.

In another possible implementation, the first feature extraction subnetwork is constructed based on at least a multi-layer perceptron network and a recurrent neural network; the first lane feature extraction subnetwork and the first road feature extraction subnetwork are constructed based on at least the multi-layer perceptron network, and the second lane feature extraction subnetwork and the second road feature extraction subnetwork are constructed based on at least the recurrent neural network; and the interaction feature vector prediction network, the lane intention prediction subnetwork, and the road intention prediction subnetwork are all constructed based on at least attention in neural networks.

In this embodiment of this application, the prediction network is constructed based on only a simple multi-layer perceptrons (MLLP) and recurrent neural networks (RNN) network rather than a complex convolutional neural networks (CNN) network. A dimension of input data is small, and computing efficiency is high.

In another possible implementation, determining the driving intention of the target vehicle based on the road intention of the target vehicle and the lane intention of the target vehicle includes determining a road corresponding to a maximum probability in the road intention of the target vehicle as a target road; determining a lane corresponding to a maximum probability in the lane intention of the target vehicle corresponding to a lane associated with the target road as a target lane; and determining the driving intention of the target vehicle based on the target road and the target lane.

Compared with a fixed-type semantic intention used in an existing method, in this embodiment of this application, intention types determined based on a structure of a map in which the target vehicle is located is not fixed, and the intention can effectively improve accuracy of a behavior description of the target vehicle. In addition, target vehicle intention prediction is converted into matching between a motion status of the target vehicle and the map information, which is different from fixed-type intention classification in the existing method. Further, the lane intention and the road intention of the target vehicle assist each other, to improve generalization and accuracy of predicting the driving intention of the target vehicle.

In another possible implementation, the driving feature of the surrounding vehicle relative to the target vehicle includes one or more of a location feature of the surrounding vehicle in a first coordinate system, a speed feature, and a head orientation feature, where an origin of the first coordinate system is a current location of the target vehicle, the first coordinate system is a rectangular coordinate system, a y-axis of the first coordinate system is parallel to a length direction of a vehicle body of the target vehicle, and a forward direction of the y-axis is consistent with a head orientation of the target vehicle.

In another possible implementation, the driving feature of the target vehicle relative to each of the plurality of roads includes: one or more of a location feature of the target vehicle in a second coordinate system, a distance feature between the target vehicle and an origin, a head orientation feature of the target vehicle, and a feature that a location of the target vehicle in the second coordinate system, a distance between the target vehicle and the origin, and the head orientation of the target vehicle change with a driving moment, where the second coordinate system is a rectangular coordinate system, the origin of the second coordinate system is determined based on an exit location of each of the plurality of roads, and an x-axis direction is determined based on a driving direction of each of the plurality of roads.

In another possible implementation, the driving feature of the target vehicle relative to each of the plurality of lanes includes: one or more of a location feature of the target vehicle in a third coordinate system, a feature of an angle formed by the head orientation of the target vehicle and a driving direction of the lane, and a feature that a location of the target vehicle in the third coordinate system, and the angle formed by the head orientation of the target vehicle and the driving direction of the lane change with the driving moment, where the third coordinate system is a frenet coordinate system, a reference line of the third coordinate system is determined based on a center line of each of the plurality of lanes, and an origin of the third coordinate system is determined based on an end point of the center line of each of the plurality of lanes.

In another possible implementation, the plurality of lanes are determined based on topology analysis performed on the plurality of roads.

In this embodiment of this application, the lanes are automatically generated based on topology analysis performed on the plurality of roads, and do not depend on a high-definition map. When high-definition map information is missing, the driving intention of the target vehicle can still be accurately predicted.

According to a second aspect, an embodiment of this application further provides a vehicle driving intention prediction apparatus. The apparatus includes a first obtaining module configured to, when a target vehicle drives to an intersection, obtain map information of the intersection, where the map information of the intersection includes road layer information and lane layer information, the road layer information includes a plurality of roads connected to the intersection, the lane layer information includes a plurality of lanes, and the lanes are some segments connected to the roads in the intersection; a second obtaining module configured to obtain driving information of the target vehicle; a first feature extraction module configured to determine a driving feature of the target vehicle relative to each of the plurality of lanes based on the driving information of the target vehicle and the lane layer information; a second feature extraction module configured to determine a driving feature of the target vehicle relative to each of the plurality of roads based on the driving information of the target vehicle and the road layer information; a prediction module configured to determine at least a lane intention of the target vehicle based on a driving feature of a surrounding vehicle relative to the target vehicle, the driving feature of the target vehicle relative to each of the plurality of roads, and the driving feature of the target vehicle relative to each of the plurality of lanes, where the surrounding vehicle is a vehicle in a preset range of the target vehicle, and the lane intention of the target vehicle represents a probability distribution that the target vehicle drives away from the intersection through each of the plurality of lanes; and a determining module configured to determine a driving intention of the target vehicle based on at least the lane intention of the target vehicle.

The prediction module is specifically configured to determine a road intention of the target vehicle and the lane intention of the target vehicle based on the driving feature of the surrounding vehicle relative to the target vehicle, the driving feature of the target vehicle relative to each of the plurality of roads, and the driving feature of the target vehicle relative to each of the plurality of lanes, where the road intention of the target vehicle represents a probability distribution that the target vehicle drives away from the intersection through each of the plurality of roads; and the determining module is specifically configured to determine the driving intention of the target vehicle based on the road intention of the target vehicle and the lane intention of the target vehicle.

In a possible implementation, the prediction module is further configured to input a driving feature of each of the surrounding vehicles relative to the target vehicle into a first interaction feature extraction network, to determine an interaction feature vector between the surrounding vehicle and the target vehicle, where the interaction feature vector between the surrounding vehicle and the target vehicle represents impact of the surrounding vehicle on the target vehicle; input the interaction feature vector between the surrounding vehicle and the target vehicle, the driving feature of the target vehicle relative to each of the plurality of lanes, and the driving feature of the target vehicle relative to a road associated with each of the plurality of lanes into a lane intention prediction network, to determine the lane intention of the target vehicle and a driving feature implicit vector of the target vehicle relative to each of the plurality of lanes; and input the driving feature of the target vehicle relative to each of the plurality of roads, the driving feature implicit vector that is of the target vehicle relative to each of the plurality of lanes and that corresponds to the plurality of lanes associated with each of the plurality of roads, and the lane intention, of the target vehicle, corresponding to a lane associated with each of the plurality of roads into a road intention prediction network, to determine the road intention of the target vehicle.

In another possible implementation, the first interaction feature extraction network includes at least a plurality of first feature extraction subnetworks and an interaction feature vector prediction network; and the inputting a driving feature of each of the surrounding vehicles relative to the target vehicle into a first interaction feature extraction network, to determine an interaction feature vector between the surrounding vehicle and the target vehicle includes inputting the driving feature of each of the surrounding vehicles relative to the target vehicle into the plurality of first feature extraction subnetworks, to determine a driving feature vector of each of the surrounding vehicles relative to the target vehicle; and inputting the driving feature vector of each of the surrounding vehicles relative to the target vehicle into the interaction feature vector prediction network, to determine the interaction feature vector between the surrounding vehicle and the target vehicle.

In another possible implementation, the lane intention prediction network includes at least a first lane feature extraction subnetwork, a second lane feature extraction subnetwork, a first road feature extraction subnetwork, a second road feature extraction subnetwork, and a lane intention prediction subnetwork; and the inputting the interaction feature vector between the surrounding vehicle and the target vehicle, the driving feature of the target vehicle relative to each of the plurality of lanes, and the driving feature of the target vehicle relative to a road associated with each of the plurality of lanes into a lane intention prediction network, to determine the lane intention of the target vehicle and a driving feature implicit vector of the target vehicle relative to each of the plurality of lanes includes inputting the driving feature of the target vehicle relative to each of the plurality of lanes into the first lane feature extraction subnetwork, to determine a driving feature vector of the target vehicle relative to each of the plurality of lanes; inputting the driving feature vector of the target vehicle relative to each of the plurality of lanes into the second lane feature extraction subnetwork, to determine the driving feature implicit vector of the target vehicle relative to each of the plurality of lanes; inputting the driving feature of the target vehicle relative to the road associated with each of the plurality of lanes into the first road feature extraction subnetwork, to determine a driving feature vector of the target vehicle relative to the road associated with each of the plurality of lanes; inputting the driving feature vector of the target vehicle relative to the road associated with each of the plurality of lanes into the second road feature extraction subnetwork, to determine a driving feature implicit vector of the target vehicle relative to the road associated with each of the plurality of lanes; and inputting the interaction feature vector between the surrounding vehicle and the target vehicle, the driving feature vector of the target vehicle relative to each of the plurality of lanes, the driving feature implicit vector of the target vehicle relative to each of the plurality of lanes, and the driving feature implicit vector of the target vehicle relative to the road associated with each of the plurality of lanes into the lane intention prediction subnetwork, to determine the lane intention of the target vehicle.

In another possible implementation, inputting the driving feature vector of the target vehicle relative to each of the plurality of lanes into the second lane feature extraction subnetwork, to determine the driving feature implicit vector of the target vehicle relative to each of the plurality of lanes includes extracting, by a plurality of feature extraction windows in the second lane feature extraction subnetwork, the driving feature vector of the target vehicle relative to each of the plurality of lanes in an order of driving moments; and determining the driving feature implicit vector of the target vehicle relative to each of the plurality of lanes based on an implicit vector output by a previous feature extraction window and a driving feature vector that is of the target vehicle relative to each of the plurality of lanes and that corresponds to a current feature extraction window.

In another possible implementation, inputting the driving feature vector of the target vehicle relative to the road associated with each of the plurality of lanes into the second road feature extraction subnetwork, to determine a driving feature implicit vector of the target vehicle relative to the road associated with each of the plurality of lanes includes extracting, by a plurality of feature extraction windows in the second road feature extraction subnetwork, the driving feature vector of the target vehicle relative to the road associated with each of the plurality of lanes in an order of driving moments; and determining the driving feature implicit vector of the target vehicle relative to the road associated to each of the plurality of lanes based on an implicit vector output by a previous feature extraction window and a driving feature vector that is of the target vehicle relative to the road associated to each of the plurality of lanes and that corresponds to a current feature extraction window.

In another possible implementation, the road intention prediction network includes at least the first road feature extraction subnetwork, the second road feature extraction subnetwork, and a road intention prediction subnetwork; and the inputting the driving feature of the target vehicle relative to each of the plurality of roads, the driving feature implicit vector that is of the target vehicle relative to each of the plurality of lanes and that corresponds to the plurality of lanes associated with each of the plurality of roads, and the lane intention, of the target vehicle, corresponding to a lane associated with each of the plurality of roads into a road intention prediction network, to determine the road intention of the target vehicle includes inputting the driving feature of the target vehicle relative to each of the plurality of roads into the first road feature extraction subnetwork, to determine a driving feature vector of the target vehicle relative to each of the plurality of roads; inputting the driving feature vector of the target vehicle relative to each of the plurality of roads into the second road feature extraction subnetwork, to determine a driving feature implicit vector of the target vehicle relative to each of the plurality of roads; performing, based on the lane intention corresponding to the lane associated with each of the plurality of roads, weighted processing on the driving feature implicit vector that is of the target vehicle relative to each of the plurality of lanes and that corresponds to the lane associated with each of the plurality of roads, and splicing weighted processing results, to obtain an implicit fusion vector of the lane associated with each of the plurality of roads; and inputting the driving feature vector of the target vehicle relative to each of the plurality of roads and the implicit fusion vector of the lane associated with each of the plurality of roads into the road intention prediction subnetwork, to determine the road intention of the target vehicle.

In another possible implementation, the first feature extraction subnetwork is constructed based on at least a multi-layer perceptron network and a recurrent neural network; the first lane feature extraction subnetwork and the first road feature extraction subnetwork are constructed based on at least the multi-layer perceptron network, and the second lane feature extraction subnetwork and the second road feature extraction subnetwork are constructed based on at least the recurrent neural network; and the interaction feature vector prediction network, the lane intention prediction subnetwork, and the road intention prediction subnetwork are all constructed based on at least attention in neural networks.

In another possible implementation, the determining module is further configured to determine a road corresponding to a maximum probability in the road intention of the target vehicle as a target road; determine a lane corresponding to a maximum probability in the lane intention of the target vehicle corresponding to a lane associated with the target road as a target lane; and determine the driving intention of the target vehicle based on the target road and the target lane.

In another possible implementation, the driving feature of the surrounding vehicle relative to the target vehicle includes one or more of a location feature of the surrounding vehicle in a first coordinate system, a speed feature, and a head orientation feature, where an origin of the first coordinate system is a current location of the target vehicle, the first coordinate system is a rectangular coordinate system, a y-axis of the first coordinate system is parallel to a length direction of a vehicle body of the target vehicle, and a forward direction of the y-axis is consistent with a head orientation of the target vehicle.

In another possible implementation, the driving feature of the target vehicle relative to each of the plurality of roads includes one or more of a location feature of the target vehicle in a second coordinate system, a distance feature between the target vehicle and an origin, a head orientation feature of the target vehicle, and a feature that a location of the target vehicle in the second coordinate system, a distance between the target vehicle and the origin, and the head orientation of the target vehicle change with a driving moment, where the second coordinate system is a rectangular coordinate system, the origin of the second coordinate system is determined based on an exit location of each of the plurality of roads, and an x-axis direction is determined based on a driving direction of each of the plurality of roads.

In another possible implementation, the driving feature of the target vehicle relative to each of the plurality of lanes includes one or more of a location feature of the target vehicle in a third coordinate system, a feature of an angle formed by the head orientation of the target vehicle and a driving direction of the lane, and a feature that a location of the target vehicle in the third coordinate system, and the angle formed by the head orientation of the target vehicle and the driving direction of the lane change with the driving moment, where the third coordinate system is a frenet coordinate system, a reference line of the third coordinate system is determined based on a center line of each of the plurality of lanes, and an origin of the third coordinate system is determined based on an end point of the center line of each of the plurality of lanes.

In another possible implementation, the plurality of lanes are determined based on topology analysis performed on the plurality of roads.

According to a third aspect, this application further provides a vehicle terminal including a memory and a processor. The memory stores executable code, and the processor executes the executable code, to implement the method according to any one of the first aspect or the possible implementations of the first aspect.

According to a fourth aspect, this application further provides a computer-readable storage medium. The computer-readable storage medium stores a computer program. When the computer program is executed in a computer, the computer is enabled to perform the method according to any one of the first aspect or the possible implementations of the first aspect.

According to a fifth aspect, this application further provides a computer program or a computer program product. The computer program or the computer program product includes instructions, and when the instructions are executed, the method according to any one of the first aspect or the possible implementations of the first aspect is implemented.

In this application, based on the implementations according to the foregoing aspects, the implementations may be combined to provide more implementations.

DESCRIPTION OF EMBODIMENTS

The following describes the technical solutions in embodiments of this application with reference to the accompanying drawings in embodiments of this application.

Figure 1:
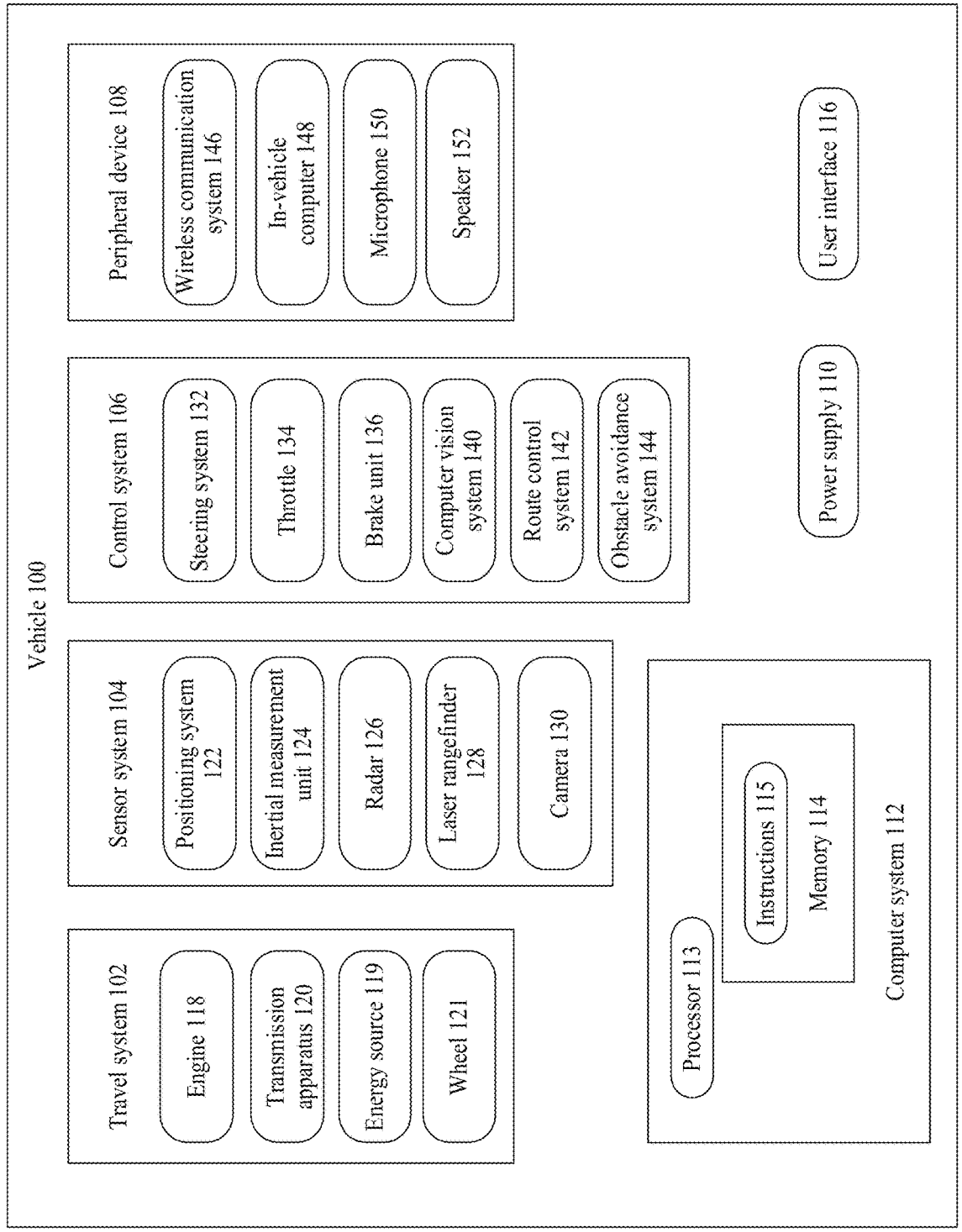
FIG. 1 is a functional block diagram of a vehicle according to an embodiment of this application.

FIG. 1 is a functional block diagram of a vehicle according to an embodiment of this application. As shown in FIG. 1, the vehicle 100 includes various subsystems, for example, a travel system 102, a sensor system 104, a control system 106, one or more peripheral devices 108, a power supply 110, a computer system 112, and a user interface 116.

Optionally, the vehicle 100 may include more or fewer subsystems, and each subsystem may include a plurality of components. In addition, all the subsystems and components of the vehicle 100 may be interconnected in a wired or wireless manner.

The travel system 102 includes a component providing power to the vehicle 100 for moving. In an example, the travel system 102 may include an engine 118, an energy source 119, a transmission apparatus 120, and a wheel 121. The engine 118 may be an internal combustion type engine, a motor, an air compression engine, or another type of engine combination, for example, a hybrid engine including a gasoline engine and a motor, or a hybrid engine including an internal combustion type engine and an air compression engine. The engine 118 converts the energy source 119 into mechanical energy.

Examples of the energy source include gasoline, diesel, other oil-based fuels, propane, other compressed gas-based fuels, anhydrous alcohol, solar panels, batteries, and other power sources. The energy source 119 may also provide energy to another system of the vehicle 100.

The transmission apparatus 120 may transmit mechanical power from the engine 118 to the wheel 121. The transmission apparatus may include a gearbox, a differential, and a drive shaft.

In an example, the transmission apparatus 120 may further include another component, for example, a clutch. The drive shaft may include one or more shafts that may be coupled to one or more wheels 121.

The sensor system 104 may include several sensors that can sense information about the ambient environment of the vehicle 100.

For example, the sensor system 104 may include a positioning system 122 (the positioning system may be a Global Positioning System (GPS), a BeiDou system, or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an oil temperature gauge) in an internal system of the vehicle 100. Sensor data from one or more of these sensors can be used to detect an object and corresponding features (a location, a shape, a direction, a speed, and the like). Such detection and recognition are key functions of safe operation of the vehicle 100.

The positioning system may be configured to estimate a geographic location of the vehicle 100. The IMU 124 is configured to sense a location and a head orientation change of the vehicle 100 based on an inertial acceleration. In an example, the IMU 124 may be a combination of an accelerometer and a gyroscope.

The radar 126 may sense an object in the ambient environment of the vehicle 100 through a radio signal. In an example, in addition to sensing an object, the radar 126 may be configured to sense a speed and/or a moving direction of the object.

The laser rangefinder 128 may sense, by using a laser, an object in an environment of the vehicle 100. In an example, the laser rangefinder 128 may include one or more laser sources, a laser scanner, one or more detectors, and other system components.

The camera 130 may be configured to capture a plurality of images of the ambient environment of the vehicle 100. The camera 130 may be a static camera or a video camera.

The control system 106 controls operations of the vehicle 100 and components of the vehicle 100. The control system 106 may include various components, including a steering system 132, a throttle 134, a brake unit 136, a sensor fusion algorithm 138, a computer vision system 140, a route control system 142, and an obstacle avoidance system 144.

The steering system 132 may be operated to adjust a moving direction of the vehicle 100. For example, in an example, the steering system 132 may include a steering wheel system.

The throttle 134 is configured to control an operating speed of the engine 118 and further control a speed of the vehicle 100.

The brake unit 136 is configured to control the vehicle 100 to decelerate. The brake unit 136 may use friction to slow down the wheel 121. In another example, the brake unit 136 may convert kinetic energy of the wheel 121 into electric energy. Alternatively, the brake unit 136 may reduce a rotational speed of the wheel 121 in another form to control the speed of the vehicle 100.

The computer vision system 140 may be operated to process and analyze an image captured by the camera 130, to recognize an object and/or a feature in the ambient environment of the vehicle 100. The object and/or the feature may include a traffic signal, a road boundary, an obstacle, and the like, and the computer vision system 140 may utilize an object recognition algorithm, a structure from motion (SFM) algorithm, video tracking, and another computer vision technology. In some examples, the computer vision system 140 may be configured to draw a map for an environment, track an object, estimate a speed of the object, and the like.

The route control system 142 is configured to determine a driving route of the vehicle 100. In some examples, the route control system 142 may determine the driving route of the vehicle 100 with reference to data from the sensor 138, the positioning system 122, and one or more predetermined maps.

The obstacle avoidance system 144 is configured to identify, evaluate, and avoid or bypass a potential obstacle in the environment of the vehicle 100 in another manner.

Certainly, in an example, the control system 106 may add or alternatively include components in addition to those shown and described; or may delete some of the foregoing components.

The vehicle 100 interacts with an external sensor, another vehicle, another computer system, or a user by using the peripheral device 108. The peripheral device 108 may include a wireless communication system 146, an in-vehicle computer 148, a microphone 150, and/or a speaker 152.

In some examples, the peripheral device 108 provides a means for a user of the vehicle 100 to interact with the user interface 116. For example, the in-vehicle computer 148 may provide information to the user of the vehicle 100. The user interface 116 may further operate the in-vehicle computer 148 to receive an input from the user. The in-vehicle computer 148 may perform an operation on a touchscreen. In another case, the peripheral device 108 may provide a means for the vehicle 100 to communicate with another device in the vehicle. For example, the microphone 150 may receive audio (for example, a voice command or another audio input) from the user of the vehicle 100. Likewise, the speaker 152 may output audio to the user of the vehicle 100.

The wireless communication system 146 may perform wireless communication with one or more devices directly or through a communication network. For example, the wireless communication system 146 may use third generation (3G) cellular communication, such as code-division multiple access (CDMA), Evolution-Data Optimized (EVDO), a Global System for Mobile Communications (GSM)/a general packet radio service (GPRS), or a fourth generation (4G) cellular network, such as Long-Term Evolution (LTE); or a fifth generation (5G) cellular communication. The wireless communication system 146 may communicate with a wireless local area network (WLAN) through Wi-Fi. In an example, the wireless communication system 146 may directly communicate with a device through an infrared link, BLUETOOTH, or ZigBee. Other wireless protocols, for example, various vehicle communication systems such as the wireless communication system 146, may include one or more dedicated short-range communications (DSRC) devices, which may include public and/or private data communication between vehicles and/or roadside stations.

The power supply 110 may provide power to various components of the vehicle 100. In an example, the power supply 110 may be a rechargeable lithium-ion or lead-acid battery. One or more battery packs of such batteries may be configured as the power supply to supply power to the components of the vehicle 100. In some examples, the power supply 110 and the energy source 119 may be implemented together, for example, in some pure electric vehicles.

Some or all of functions of the vehicle 100 are controlled by the computer system 112. The computer system 112 may include at least one processor 113, and the processor 113 executes instructions 115 stored in a non-transient computer-readable storage medium such as a memory 114. The computer system 112 may alternatively be a plurality of computing devices that control an individual component or a subsystem of the vehicle 100 in a distributed manner.

The processor 113 may be any conventional processor, such as a commercially available central processing unit (CPU). Optionally, the processor may be a dedicated device such as an application-specific integrated circuit (ASIC) or another hardware-based processor. Although FIG. 1 functionally displays a processor, a memory, and another component of a computer 110 in a same block, a person of ordinary skill in the art should understand that the processor, the computer, or the memory may actually include a plurality of processors, computers, or memories stored in a same physical housing/different physical housings. For example, the memory may be a hard disk drive or another storage medium located in a housing of a different computer 110. Therefore, it is understood that a reference to the processor or the computer includes a reference to a set of processors or computers or memories that may or may not operate in parallel. Different from using a single processor to perform steps described herein, some components such as a steering component and a deceleration component may have respective processors. The processor performs only computation related to a component-specific function.

In each aspect described herein, the processor may be located far away from the vehicle and perform wireless communication with the vehicle. In another aspect, some processes described herein are performed on a processor disposed inside the vehicle, while others are performed by a remote processor, including performing steps necessary for a single operation.

In some examples, the memory 114 may include the instructions 115 (for example, program logic), and the instructions 115 may be executed by the processor 113 to perform various functions of the vehicle 100, including the functions described above. The memory 114 may also include extra instructions, including instructions used to send data to, receive data from, interact with, and/or control one or more of the travel system 102, the sensor system 104, the control system 106, and the peripheral device 108.

In addition to the instructions 115, the memory 114 may further store data, such as a road map, route information, and a location, a direction, a speed, and other similar vehicle data of the vehicle, and other information. Such information may be used by the vehicle 100 and the computer system 112 when the vehicle 100 operates in an autonomous mode, a semi-autonomous mode, and/or a manual mode.

The user interface 116 is configured to provide information for or receive information from the user of the vehicle 100. Optionally, the user interface 116 may include one or more input/output devices within a set of peripheral devices 108, for example, the wireless communication system 146, the in-vehicle computer 148, the microphone 150, and the speaker.

The computer system 112 may control a function of the vehicle 100 based on inputs received from various subsystems (for example, the travel system 102, the sensor system 104, and the control system 106) and from the user interface 116. For example, the computer system may use an input from the control system 106 to control the steering unit 132 to avoid an obstacle detected by the sensor system 104 and the obstacle avoidance system 144. In some examples, the computer system 112 may be operated to provide control over many aspects of the vehicle 100 and the subsystems of the vehicle 100.

Optionally, one or more of the foregoing components may be installed separately from or associated with the vehicle 100. For example, the memory 114 may be partially or totally separated from the vehicle 100. The foregoing components may be communicatively coupled together in a wired and/or wireless manner.

Optionally, the foregoing components are merely examples. During actual application, components in each module may be added or deleted based on an actual requirement. FIG. 1 should not be construed as a limitation on embodiments of this application.

An autonomous vehicle traveling on a road, for example, the vehicle 100, may recognize an object in the ambient environment of the vehicle to determine a current speed. The object may be another vehicle, a traffic control device, or another type of object. In some examples, each identified object may be considered independently, and a feature of each object such as a current speed of the object, an acceleration of the object, and a spacing between the object and the vehicle may be used to determine a speed to be adjusted by the autonomous vehicle.

Optionally, the autonomous vehicle 100 or a computing device associated with the autonomous vehicle 100 (for example, the computer system 112, the computer vision system 140, or the memory 114 in FIG. 1) may predict behavior of the identified object based on a feature of the identified object and a state of the ambient environment (for example, traffic, rain, snow, and ice on a road). Optionally, the identified objects depend on behavior of each other. Therefore, all the identified objects may be considered together to predict behavior of a single identified object. The vehicle 100 can adjust the speed of the vehicle 100 based on the predicted behavior of the identified object. In other words, the autonomous vehicle can determine, based on the predicted behavior of the object, a state (for example, accelerated, decelerated, or stopped) to which the vehicle needs to be adjusted. In this process, another factor may also be considered to determine the speed of the vehicle 100, for example, a horizontal location of the vehicle 100 on a driving road, a curvature of the road, and proximity between a static object and a dynamic object.

In addition to providing an instruction to adjust the speed of the autonomous vehicle, the computing device may further provide an instruction to modify a steering angle of the vehicle 100, so that the autonomous vehicle follows a specified track and/or keeps safe horizontal and vertical distances from an object near the autonomous vehicle (for example, a car in an adjacent lane of the road).

The vehicle 100 may be a car, a truck, a motorcycle, a bus, a boat, an airplane, a helicopter, a lawn mower, an entertainment vehicle, a playground vehicle, a construction device, a tram, a golf cart, a train, a trolley, or the like, which is not particularly limited in embodiments of this application.

Figure 2:
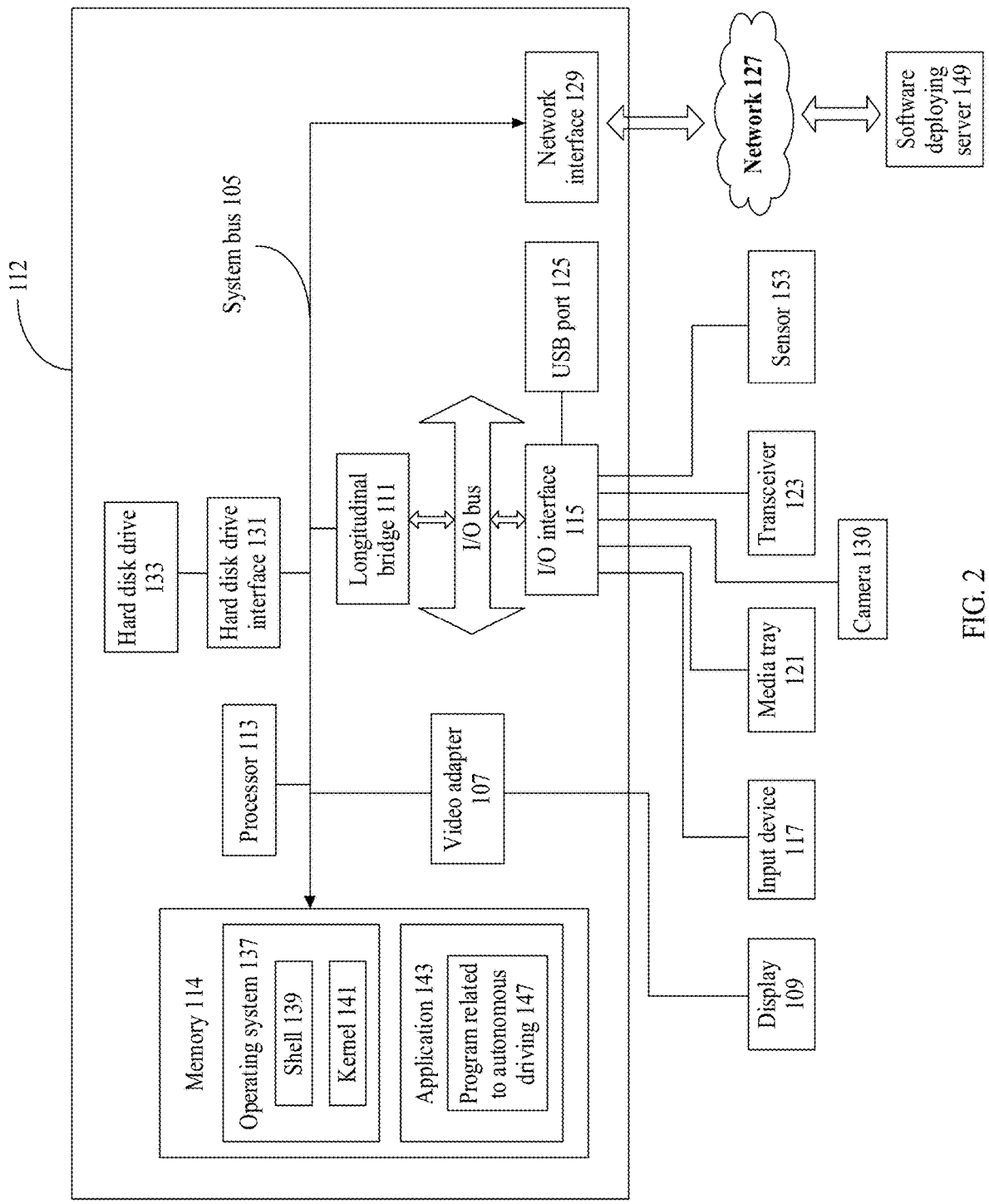
FIG. 2 is a schematic diagram of a structure of a computer system according to an embodiment of this application.

FIG. 2 is a schematic diagram of the computer system according to this embodiment of this application.

The computer system 112 shown in FIG. 2 includes a processor 113, and the processor 113 is coupled to a system bus. The processor 113 may be one or more processors, and each processor may include one or more processor cores. A video adapter 107 may drive a display 109, and the display 109 is coupled to the system bus 105. The system bus 105 is coupled to an input/output (I/O) bus 113 through a bus bridge 111. An I/O interface 115 is coupled to the I/O bus. The I/O interface 115 communicates with a plurality of devices, for example, an input device 117 (for example, a keyboard, a mouse, or a touchscreen), a media tray 121, for example, a compact disc (CD)-read-only memory (ROM), or a multimedia interface, a transceiver 123 (which may send and/or receive a radio communication signal), a camera 155 (which may capture static and dynamic digital video images), and an external Universal Serial Bus (USB) port 125. Optionally, a port connected to the I/O interface 115 may be a USB port.

The processor 113 may be any conventional processor, including a reduced instruction set computing (RISC) processor, a complex instruction set computing (CISC) processor, or a combination thereof. Optionally, the processor may be a dedicated apparatus such as an ASIC. Optionally, the processor 113 may be a neural network processor or a combination of the neural network processor and the foregoing conventional processor.

Optionally, in various embodiments described herein, the computer system 112 may be located far away from an autonomous vehicle and may perform wireless communication with the autonomous vehicle. In another aspect, some of processes described herein are performed on a processor disposed in the autonomous vehicle, and others are performed by a remote processor, including taking behavior required to perform a single operation.

The computer system 112 may communicate with a software deploying server 149 through a network interface 129. The network interface 129 is a hardware network interface, for example, a network adapter. A network 127 may be an external network, for example, an internet, or may be an internal network, for example, Ethernet or a virtual private network (VPN). Optionally, the network 127 may alternatively be a wireless network such as a Wi-Fi network or a cellular network.

A hard disk drive interface is coupled to the system bus 105. The hard disk drive interface is connected to a hard disk drive. A memory 114 is coupled to the system bus 105. Data running in the memory 114 may include an operating system 137 and an application 143 of the computer system 112.

The operating system includes a shell 139 and a kernel 141. The shell 139 is an interface between a user and the kernel of the operating system. The shell is an outermost layer of the operating system. The shell manages interaction between the user and the operating system, waits for an input of the user, explains the input of the user to the operating system, and processes various output results of the operating system.

The kernel 141 includes parts of the operating system that are used for managing a memory, a file, a peripheral device, and a system resource, and directly interacts with hardware. The kernel of the operating system usually runs processes, provides communication between the processes, and provides CPU time slice management, interruption, memory management, I/O management, and the like.

The application 143 includes programs related to controlling autonomous driving of the vehicle, for example, a program for managing interaction between the autonomous vehicle and an obstacle on a road, a program for controlling a route or a speed of the autonomous vehicle, and a program for controlling interaction between the autonomous vehicle and another autonomous vehicle on the road. The application 143 may be on a system of the software deploying server 149. In an example, when the application 147 needs to be executed, the computer system 112 may download the application 143 from the software deploying server 149.

For example, the application 141 may also be a program for controlling the autonomous vehicle to avoid collision with another vehicle and safely pass through an intersection.

A sensor 153 is associated with the computer system 112. The sensor 153 is configured to detect an ambient environment of the computer system 112. For example, the sensor 153 may detect an animal, a vehicle, an obstacle, or cross walk. Further, the sensor may further detect an ambient environment of an object such as the animal, the vehicle, the obstacle, or the cross walk. Optionally, if the computer system 112 is located in the autonomous vehicle, the sensor may be a camera, an infrared sensor, a chemical detector, a microphone, or the like.

For example, the processor 113 may predict a driving track of another vehicle based on a surrounding road condition and another vehicle condition that are detected by the sensor 153.

The processor 113 may input current driving information of another vehicle and current road information by using a pre-trained neural network, to obtain the predicted driving track of the another vehicle. The pre-trained neural network may be obtained based on a large amount of training sample data. For example, the training data may include current driving information of another vehicle and road information that are detected, and driving information of the another vehicle after a preset time period. The processor 113 may obtain a target model through training based on the training data. The target model may be used to determine predicted driving information of the vehicle based on the current driving information of the vehicle and the road information. The processor 113 processes the input current driving information and road information of the vehicle, and compares the output predicted driving information with actual driving information of the vehicle after the preset time period, until a difference between the predicted driving information output by the processor 113 and the actual driving information of the vehicle is less than a specific threshold, so as to complete training of the target model.

Figure 3:
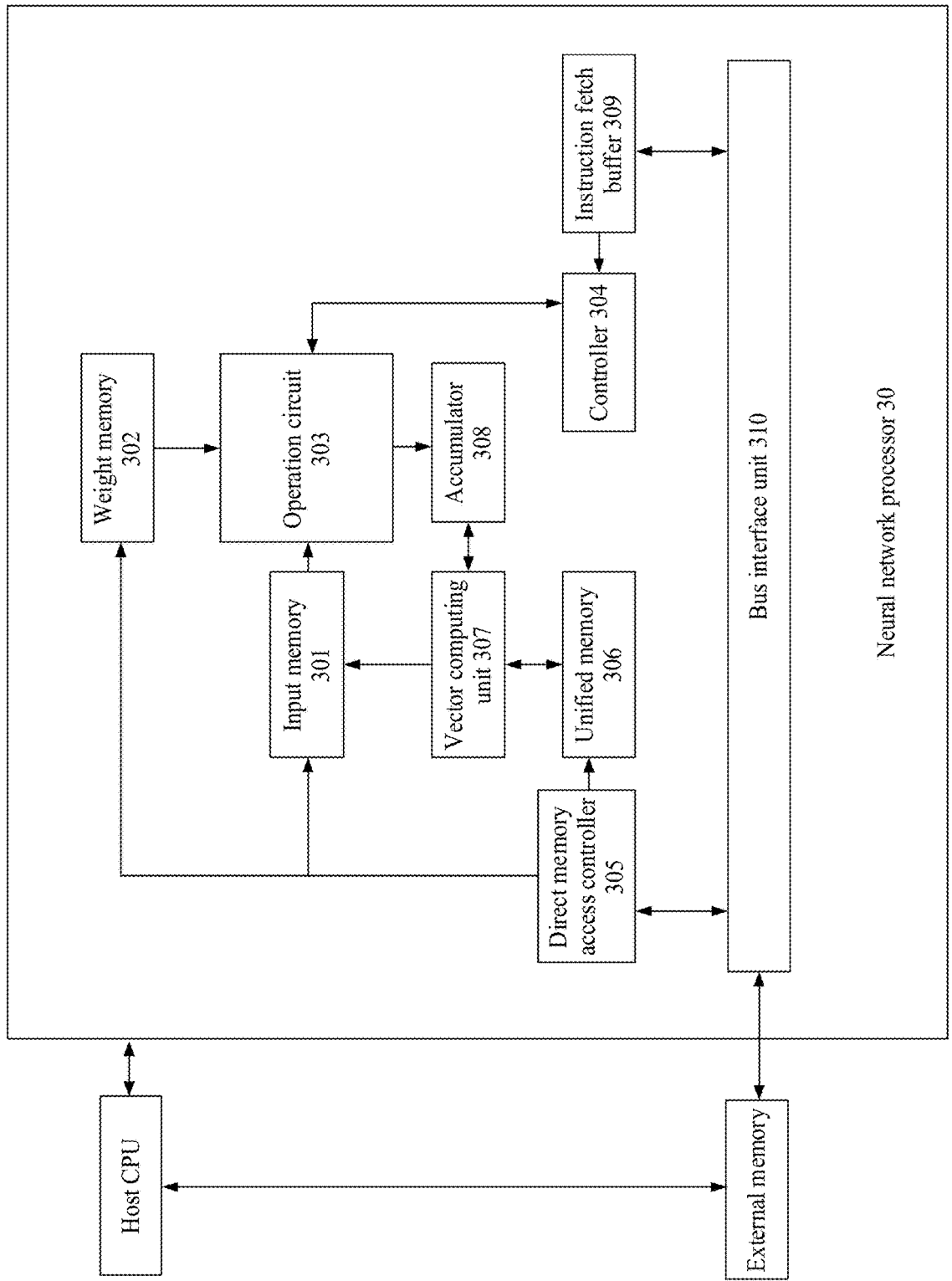
FIG. 3 is a schematic diagram of a hardware structure of a chip according to an embodiment of this application.

FIG. 3 is a schematic diagram of a hardware structure of a chip according to this embodiment of this application. The chip includes a neural network processor (network processing unit (NPU)) 30. The chip may be disposed in the processor 113 shown in FIG. 2, and is configured to determine the predicted driving track of another vehicle. Algorithms at all layers in the pre-trained neural network may be implemented in the chip shown in FIG. 3.

A vehicle driving intention prediction method in embodiments of this application is performed in an operation circuit 303 and/or a vector computing unit 307 in the neural network processor 30, to obtain a driving intention of a target vehicle.

The following briefly describes each module and unit in the neural network processor 30.

The neural network processor 30 is mounted to a host CPU as a coprocessor, and a task is allocated by the host CPU. A core part of the neural network processor 30 is the operation circuit 303. When the neural network processor 30 works, a controller 304 in the neural network processor 30 may control the operation circuit 303 to extract matrix data in the memory and perform a multiplication operation.

In some implementations, the operation circuit 303 internally includes a plurality of process engines (PEs). In some implementations, the operation circuit 303 is a two-dimensional systolic array. Alternatively, the operation circuit 303 may be a one-dimensional systolic array or another electronic circuit that can perform mathematical operations such as multiplication and addition. In some implementations, the operation circuit 303 is a general-purpose matrix processor.

For example, it is assumed that there is an input matrix A, a weight matrix B, and an output matrix C. The operation circuit fetches data corresponding to the matrix B from a weight memory 302, and caches the data on each PE in the operation circuit. The operation circuit fetches data corresponding to the matrix A from an input memory 301, to perform a matrix operation on the matrix B, and stores an obtained partial result or an obtained final result of the matrix into an accumulator 308.

The vector computing unit 307 may further process an output of the operation circuit, for example, vector multiplication, vector addition, an index operation, a logarithm operation, and size comparison. For example, the vector computing unit 307 may be configured to perform network computing, such as pooling, batch normalization, or local response normalization, at a non-convolutional/non-fully connected layer (fully connected (FC) layer) of a neural network.

In some implementations, the vector computing unit 307 can store, in a unified cache 306, an output vector that is processed. For example, the vector computing unit 307 may apply a non-linear function to the output, for example, a vector of an accumulated value, of the operation circuit 303 to generate an activation value. In some implementations, the vector computing unit 307 generates a normalized value, a combined value, or both. In some implementations, the output vector that is processed can be used as an activation input for the operation circuit 303, for example, can be used at a subsequent layer of the neural network.

The unified memory 306 is configured to store input data and output data.

For weight data, a direct memory access controller (DMAC) 305 transfers input data in an external memory to the input memory 301 and/or the unified memory 306, stores weight data in the external memory into the weight memory 302, and stores data in the unified memory 306 into the external memory.

A BIU is a bus interface unit, namely, a bus interface unit 310, and is configured to implement interaction between a primary CPU, the DMAC, and an instruction fetch buffer 309 through a bus.

The instruction fetch buffer 309 connected to the controller 304 is configured to store instructions used by the controller 304.

The controller 304 is configured to invoke the instructions cached in the instruction fetch buffer 309, to implement a working process of controlling an operation accelerator.

Usually, the unified memory 306, the input memory 301, the weight memory 302, and the instruction fetch buffer 309 may all be on-chip memories. The external memory of the NPU may be a memory outside the NPU, and the external memory may be a double data rate (DDR) synchronous dynamic random-access memory (SDRAM), a high bandwidth memory (HBM), or another readable and writable memory. It should be understood that the hardware structure of the chip shown in FIG. 3 is merely an example for description, and this application is not limited thereto.

The following describes embodiments of this application in detail with reference to FIG. 4 to FIG. 11.

Figure 4:
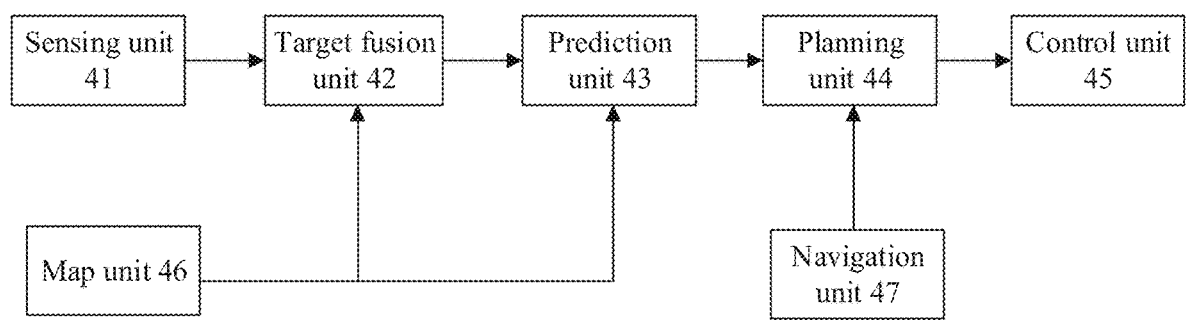
FIG. 4 is a block diagram of an autonomous driving system according to an embodiment of this application.

FIG. 4 is a block diagram of an autonomous driving system according to this application. As shown in FIG. 4, the autonomous driving system includes a sensing unit 41, a target fusion unit 42, a prediction unit 43, a planning unit 44, a control unit 45, a map unit 46, and a navigation unit. The prediction unit 43 undertakes the sensing unit 41, the target fusion unit 42, and the map unit 46, and may provide a future behavior intention and track of an obstacle by using a prediction algorithm, and then output the behavior intention and track to the downstream planning module. This can help the vehicle predict a future track of another target vehicle and determine importance of a target, and in a dangerous scenario, help makes planning and controlling to take an emergency security measure to ensure vehicle safety and avoid collision.

A function of the sensing unit 41 is implemented based on the sensor system 104 in FIG. 1 or the sensor 153 in FIG. 2. The sensing unit 41 senses environment information around the vehicle 100, for example, information of an object that affects driving such as an obstacle (for example, another vehicle, a pedestrian, or an animal) and road information (for example, cross walk, a lane line, or a traffic signal light). The target fusion unit 42 processes the environment information around the vehicle sensed by the sensing unit 41, and outputs obstacle target information. The map unit is stored in the memory 114 in FIG. 1 or FIG. 2. The prediction unit 43 predicts the behavior intention and the future track of the target vehicle based on current map information and the target information sensed by the sensing unit. The planning unit 44 plans a driving route of the vehicle based on a prediction result of the prediction unit and/or output information of the navigation unit 47. The control unit 45 controls, based on the driving route planned by the planning unit, the vehicle to drive on the planned driving route. The target fusion unit 42, the prediction unit 43, the planning unit 43, and the control unit 45 are all implemented in the processor in FIG. 1 or FIG. 2. In a driving process of the vehicle, an intention of another vehicle is predicted in real time, accurately, and reliably, so that the vehicle can predict a traffic condition in front of the vehicle, and establish a traffic situation around the vehicle. This helps determine importance of the target of another surrounding vehicle of the vehicle, and filter a key target for interaction, so that the vehicle can plan the route in advance and safely pass through a complex road condition scenario.

There are a plurality of solutions for a vehicle track prediction method. For example, one solution is mainly, by using a regular-based track prediction algorithm, to compute a possible driving track in a future period of time by using a motion model such as a uniform speed model and based on a location and motion speed information of the predicted target. In this method, limited information is usually used, and few elements are considered. When vehicle motion information output by a current end is inaccurate, a prediction result usually deviates greatly from an actual result.

Another solution is a probability theory prediction method based on data statistics, such as a dynamic Bayesian network (DBN) and a hidden Markov model (HMM). An advantage is that a large amount of actual data is used for regular statistics. However, this method usually requires sufficient samples to obtain a more reliable statistical probability value. In addition, an increase in a quantity of parameters during algorithm design greatly increases computing complexity.

Still another solution is a CNN-based intention prediction method. Target observation data of a specific time length needs to be accumulated, and a rasterized image is used to represent a motion status (a target location) of a target and high-definition map information (mainly including a virtual lane line). Then, an image feature is extracted by using a CNN network, and then a target intention and track are predicted. In this method, the target status and high-definition map information are converted into high-dimensional image data, and operation complexity is high. In addition, the observation data of the specific time length is depended on. As a result, real-time performance and timeliness of this method are poor.

It may be understood that a high-definition map is a map accurate to a lane level, and an auxiliary line, namely, a virtual lane, is added to an area without a real lane line at an intersection, so as to restrict driving of an autonomous vehicle. In a high-level autonomous driving system, the high-definition map is used as an auxiliary tool or prior information, to help the autonomous vehicle better predict a behavior intention of another target vehicle. In an urban traffic intersection scenario, a behavior difference of the vehicle is more obvious because a road structure is complex and changeable and there is no specific physical lane driving line constraint. Because structures of different intersections vary greatly, it is difficult to accurately describe the behavior intention of the target vehicle with a fixed-type semantic intention, such as going straight, turning left, turning right, or turning around. In addition, the virtual lane in the high-definition map may be missing or inaccurate. Therefore, it is particularly difficult to accurately predict a high-order intention of the vehicle.

In the foregoing solution, prediction accuracy is poor in a complex intersection scenario. For this problem, a solution is proposed: In a coordinate system in which a location of the target vehicle is used as an origin and a head orientation of the target vehicle is a y-axis, the intersection is divided into twelve sector areas, and target intention prediction is converted into a twelve-element classification problem, where a sector area including a real exit of the target is a target real category. In this solution, after the observation data of the specific time length is accumulated, the rasterized image is used to represent the track of the target vehicle, the high-definition map information, and the target track of the another vehicle, where the high-definition map information mainly includes lane line information. Then, features are extracted by using a CNN network, and probabilities of the twelve sector areas are computed by using a softmax classifier. An exit in a sector area with a highest probability is a predicted target vehicle exit, namely, the target intention.

However, the solution has the following disadvantages: In this solution, the feature associated between the target vehicle and the virtual lane line information in the high-definition map information is extracted by using the CNN network, and when the virtual lane information is inaccurate or even missing, the intention of the target vehicle cannot be effectively predicted. Therefore, the solution has a problem of strong dependence on the high-definition map information. In addition, in this solution, the target vehicle intention prediction problem is converted into the twelve-element classification problem. The twelve-element classification corresponds to different sectors in the target vehicle coordinate system. In actual application, the target vehicle exit does not necessarily fall in a sector. Therefore, performance varies greatly in scenarios of intersections of different structures, and generalization performance is insufficient. In one aspect, because the high-dimensional rasterized image is used to represent the tracks of the target vehicle and the other vehicle and the high-definition map information, input data dimensions are greatly increased. In addition, the deep CNN network has high operation complexity, has a specific requirement on a computing capability of a platform, and has high computing complexity. In another aspect, the solution needs to accumulate the observation data of the specific time length to predict the intention of the target vehicle. When the intention of the target vehicle changes or the target vehicle is in a tracking start phase, the target intention cannot be predicted in time, and there is a problem of poor timeliness. In still another aspect, there is a one-to-many possibility in the intention prediction problem, namely, a multi-modal problem. In this solution, the multi-modal intention prediction problem is converted into the specific twelve-element classification problem. Therefore, the multi-modal problem in the intention prediction cannot be resolved.

This application provides a vehicle driving intention prediction method. A road intention and a lane intention of a target vehicle are first determined based on a driving feature of a surrounding vehicle relative to the target vehicle, a driving feature of the target vehicle relative to a road, and a driving feature of the target vehicle relative to a lane, and then a driving intention of the target vehicle is determined based on the road intention and the lane intention of the target vehicle. The driving intention of the target vehicle is determined by predicting a multi-level intention (namely, the lane intention and the road intention) of the target vehicle. This can effectively and accurately represent driving behavior of the target vehicle, and can adapt to scenarios of intersections of different structures, thereby avoiding an inaccurate and vague description of the driving behavior of the target vehicle by a predefined fixed-type intention (for example, turning left, turning right, or turning around).

Figure 5:
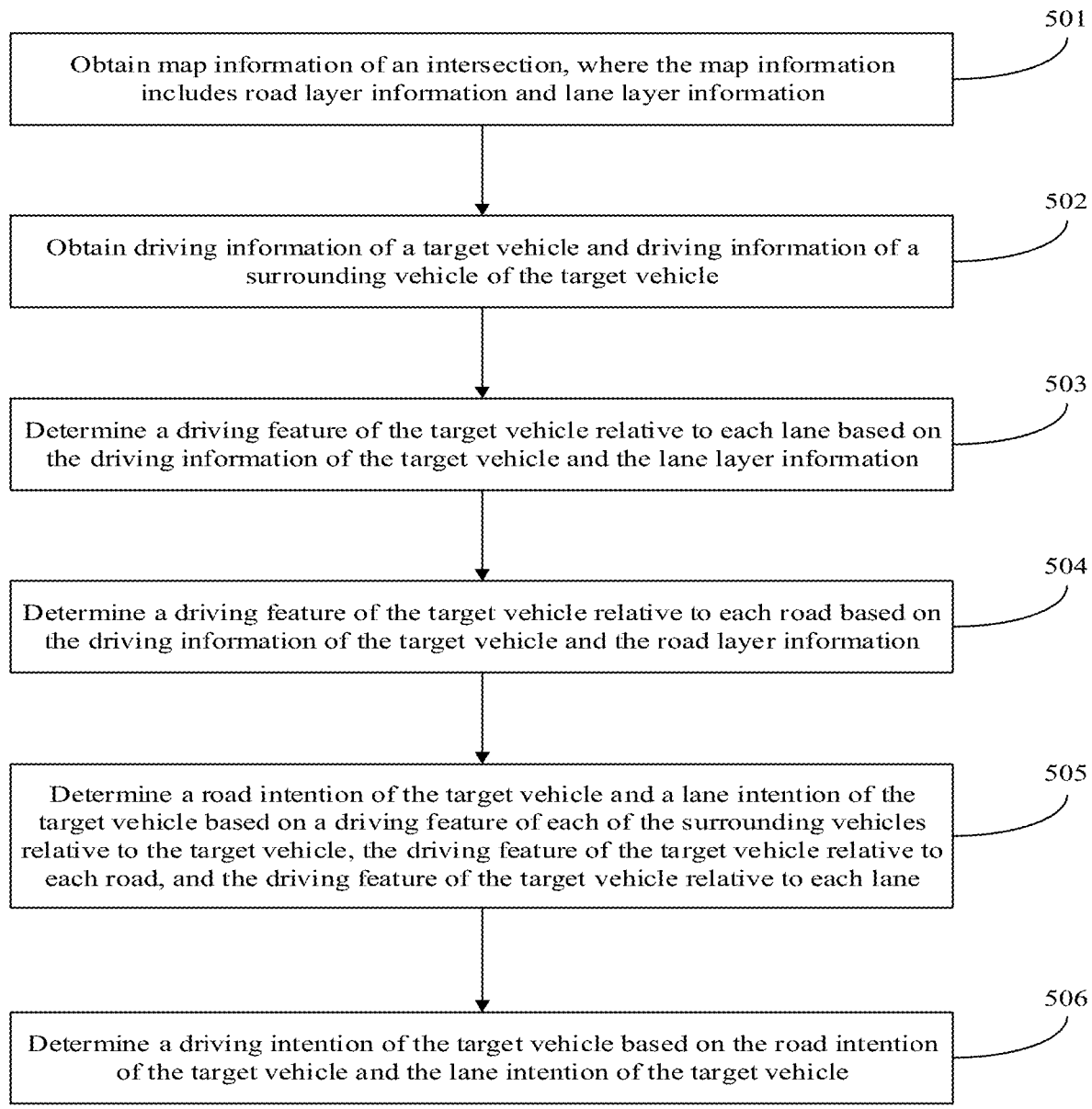
FIG. 5 is a flowchart of a vehicle driving intention prediction method according to an embodiment of this application.

The following describes in detail the vehicle driving intention prediction method according to embodiments of this application with reference to FIG. 5 The method may be performed by the vehicle in FIG. 1. A trained target model is configured in the vehicle. The computer system in FIG. 2 and the chip in the structure in FIG. 3 are configured in the vehicle.

FIG. 5 is a flowchart of a vehicle driving intention prediction method according to an embodiment of this application. As shown in FIG. 5, the vehicle driving intention prediction method provided in this application includes steps S501 to S506.

When a target vehicle drives to an intersection, the method is performed. In step S501, map information of the intersection is obtained.

The map information may be image information that describes spatial information such as a road, a traffic condition, and an administrative region in the real world, or may be map data of a user-defined virtual world. The map information may be used for ground traffic control, vehicle navigation, vehicle driving route planning, and the like.

In some examples, the map information includes at least road layer information and lane layer information, the road layer information includes a plurality of roads connected to the intersection, the lane layer includes a plurality of lanes, and the lanes are some segments of the connected roads in the intersection.

It may be understood that the intersection is an area formed by cross-converging the plurality of roads, and the intersection indicates a range of the area formed by cross-converging the plurality of roads. The lane is a segment that is in the area formed by cross-converging the plurality of roads and that connects the plurality of roads, and is used to restrict the vehicle to drive to a road in the plurality of roads.

Figure 6:
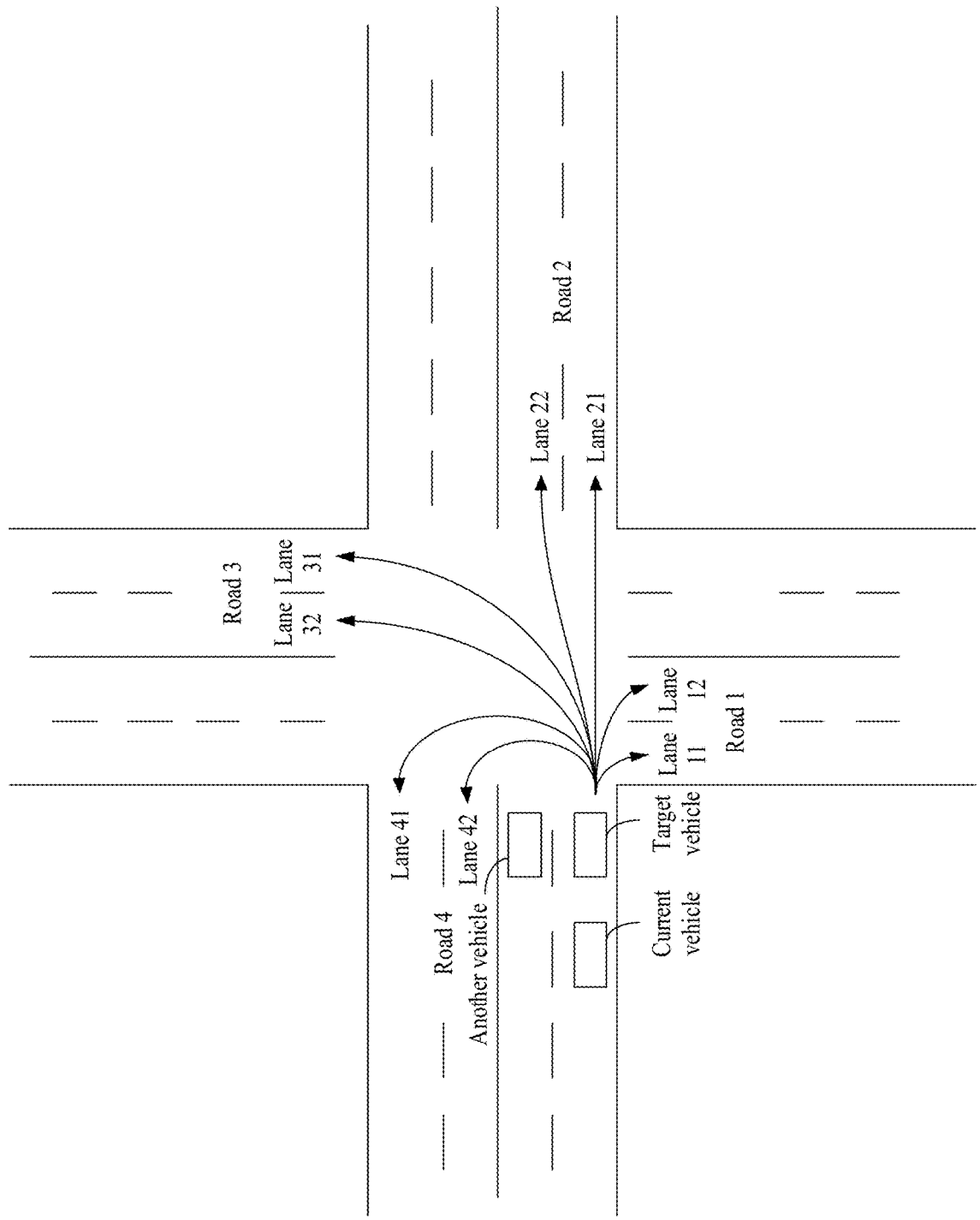
FIG. 6 is a schematic diagram of a map of an intersection obtained when a target vehicle drives to the intersection.

For example, FIG. 6 shows a map of the intersection. The road layer information includes the plurality of roads connected to the intersection, for example, a road 1, a road 2, a road 3, and a road 4. The lane layer information includes a plurality of lanes that are connected to the roads at the intersection, for example, a lane 11 and a lane 12 that are connected to the road 1, a lane 21 and a lane 22 that are connected to the road 2, a lane 31 and a lane 32 that are connected to the road 3, and a lane 41 and a lane 42 that are connected to the road 4. It is easy to understand that FIG. 6 shows only lanes on which the target vehicle may drive at a current location (an outer lane of the road 2), that is, lanes starting from the current location of the target vehicle, and does not represent all lanes in the map information of the intersection.

In an example, the map information includes a high-definition map, and the high-definition map may include a static high-definition map layer and a dynamic high-definition map layer.

The static high-definition map layer includes a map layer including static information, such as a road component layer, a lane layer, and a road attribute layer. Specifically, the lane layer may include road detail information, for example, information such as a lane line, a lane center line, a lane width, a curvature, a gradient, a course, and a lane rule. The road component layer may include road components such as a traffic sign and a road surface sign, for example, record a precise location and a height of a traffic signal light.

The dynamic high-definition map layer may include a map layer including dynamic traffic information, such as a road congestion layer, a construction situation layer, a traffic accident layer, a traffic control layer, and a weather layer. For example, the construction situation layer may include information such as renovation, road marking line wear and re-painting, and traffic marking change.

When the map information includes the high-definition map, the map information of the intersection may be obtained in a direct invoking/downloading manner. For example, map information of an intersection that corresponds to location information and that is stored in a memory is invoked based on the location information of the target vehicle; or the map information of an intersection corresponding to location information is downloaded from a cloud server based on the location information of the target vehicle.

In another example, the map information does not include a high-definition map, and the map information includes a regular map, and includes road layer information, but does not include a virtual lane line in an intersection scenario in the high-definition map. In this case, manners of obtaining the map information are invoking, based on location information of the target vehicle, the map information of an intersection corresponding to the location information stored in a memory, or downloading, from a cloud server based on location information of the target vehicle, the map information of an intersection corresponding to the location information. Then, lane information of the lane layer is determined by using a topology analysis method. For example, refer to FIG. 6. Start locations and end locations of the lane 11, the lane 12, the lane 21, the lane 22, the lane 31, the lane 32, the lane 41, and the lane 42 are obtained through topology analysis, and then lane lines of the lane 11, the lane 12, the lane 21, the lane 22, the lane 31, the lane 32, the lane 41, and the lane 42 are determined based on a cubic spline interpolation method.

Alternatively, a manner of obtaining the map information may be that a sensor collects environment information around the vehicle, for example, a plurality of pieces of road information of the intersection, constructs the road layer information based on the plurality of pieces of road information, determines lane information of a lane layer based on topology analysis, and finally constructs the map information of the intersection. A manner of obtaining the map information is not limited in this application, provided that the map information can be obtained.

In this way, when the high-definition map cannot be obtained, or the lane layer information in the high-definition map is missing, the vehicle driving intention prediction method in this embodiment of this application can still be successfully performed, without dependence on the high-definition map, and has better generalization.

In step S502, driving information of the target vehicle and driving information of a surrounding vehicle of the target vehicle are obtained.

In this embodiment, the target vehicle may be understood as a vehicle that has great impact on driving of a current vehicle, for example, a vehicle in front of the current vehicle. The surrounding vehicle of the target vehicle may be understood as another vehicle that is at a specific distance from the target vehicle. The distance may be set by a user, or may be set by a skilled person, or may be related to a sensing distance of a sensor of the current vehicle.

It is easy to understand that the target vehicle and the surrounding vehicle of the target vehicle may be any one of an autonomous vehicle, a non-autonomous vehicle, a new energy vehicle, a fuel vehicle, or the like. This is not limited in this application.

In an example, the driving information of the target vehicle or the surrounding vehicle includes information that can be sensed by the current vehicle and that affects a driving intention of the target vehicle, for example, location information, driving speed information, driving direction information, and head orientation information of the target vehicle and the vehicle around.

After the driving information of the target vehicle and the driving information of the surrounding vehicle of the target vehicle are obtained, a driving feature of the surrounding vehicle of the target vehicle relative to the target vehicle, namely, an interaction feature between the target vehicle and another vehicle, may be determined based on the driving information of the target vehicle and the driving information of the surrounding vehicle of the target vehicle.

In an example, a method for obtaining the interaction feature between the target vehicle and the another vehicle may be extracted according to the following rule: extracting one or more of a location feature of each of the surrounding vehicles in a first coordinate system, a speed feature, and a head orientation feature, where an origin of the first coordinate system is a current location of the target vehicle, the first coordinate system is a rectangular coordinate system, a y-axis of the first coordinate system is parallel to a length direction of a vehicle body of the target vehicle, and a forward direction of the y-axis is consistent with a head orientation of the target vehicle.

In step S503, a driving feature of the target vehicle relative to each lane, namely, an interaction feature between the target vehicle and each lane, is determined based on the driving information of the target vehicle and the lane layer information.

In an example, the interaction feature between the target vehicle and each lane may be extracted according to the following rule: extracting one or more of a location feature of a target vehicle in each third coordinate system, a feature of an angle formed by the head orientation of the target vehicle and a driving direction of the lane, and a feature that a location of the target vehicle in each third coordinate system, and the angle formed by the head orientation of the target vehicle and the driving orientation of the lane change with the driving moment, where each third coordinate system is a frenet coordinate system, a reference line of each third coordinate system is determined based on a center line of each lane, and an origin of each third coordinate system is determined based on an end point of the center line of each lane.

It is easy to understand that a center line of a lane is a line formed by sequentially connecting center points in a width direction of the lane from a start point of the lane to an end point of the lane.

Figure 7:
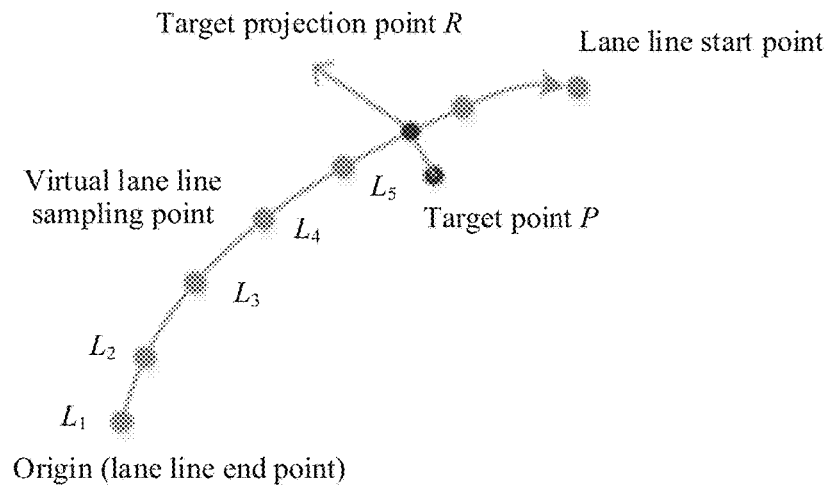
FIG. 7 is a schematic diagram of a third coordinate system determined by using a center line of a lane as a reference line.

FIG. 7 is used as an example to describe a method for computing coordinates of a target location in a third coordinate system. The computing method is as follows:

$$y = \sum_{j=0,1,2,\ldots,5} L_j$$

$$x = |PR|$$

$L_j$ is a length of a virtual lane line segment, and j=0, 1, 2, 3, 4; $L_5$ is a distance between an end point of a previous line segment and a target projection point; and $|\cdot|$ is a vector length.

In step S504, a driving feature of the target vehicle relative to each road, namely, an interaction feature between the target vehicle and each road, is determined based on the driving information of the target vehicle and the road layer information.

In an example, the interaction feature between the target vehicle and each road may be extracted according to the following rule: extracting one or more of a location feature of the target vehicle in each second coordinate system, a distance feature between the target vehicle and an origin, a head orientation feature of the target vehicle, and a feature that a location of the target vehicle in each second coordinate system, a distance between the target vehicle and the origin, and the head orientation of the target vehicle change with a driving moment, where each second coordinate system is a rectangular coordinate system, an origin of each second coordinate system is determined based on an exit location of each road, and an x-axis direction is determined based on a driving direction of each road.

It may be understood that the extraction rules of the interaction feature between the target vehicle and the other vehicle, the interaction feature between the target vehicle and each lane, and the interaction feature between the target vehicle and each road are merely examples of extraction rules. Alternatively, the interaction feature between the target vehicle and the other vehicle, the interaction feature between the target vehicle and each lane, and the interaction feature between the target vehicle and each road may be extracted according to another extraction rule. This is not limited in this embodiment of this application.

In step S505, a road intention of the target vehicle and a lane intention of the target vehicle are determined based on the interaction feature between the target vehicle and the another vehicle, the interaction feature between the target vehicle and each lane, and the interaction feature between the target vehicle and each road.

The road intention of the target vehicle represents a probability distribution that the target vehicle drives away from the intersection through each road, and the lane intention of the target vehicle represents a probability distribution that the target vehicle drives away from the intersection through each lane.

Further, the interaction feature between the target vehicle and each of the other vehicles is input into an interaction feature vector extraction network corresponding to the target vehicle and the other vehicle, to extract an interaction feature vector between the target vehicle and the other vehicle. The vector represents impact of the other vehicle on the driving intention of the target vehicle.

In an example, the interaction feature vector extraction network corresponding to the target vehicle and the other vehicle includes a plurality of feature extraction subnetworks and an interaction feature vector prediction network. A driving feature of each of the other vehicles relative to the target vehicle is separately input into the plurality of feature extraction subnetworks, to obtain a driving feature vector of each of the other vehicles relative to the target vehicle. The driving feature vector of each of the other vehicles relative to the target vehicle is input into the interaction feature vector prediction network, to obtain an interaction feature vector between the another vehicle and the target vehicle.

Figure 8:
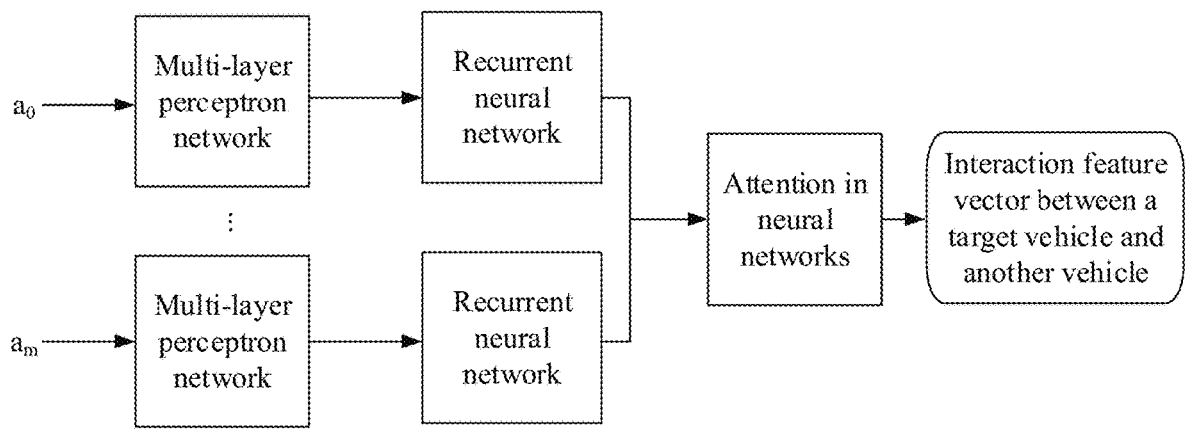
FIG. 8 is a schematic diagram of a structure of an interaction feature vector extraction network between a target vehicle and another vehicle.

As shown in FIG. 8, the feature extraction subnetwork is constructed based on a MLLP network and a RNN, and the interaction feature vector prediction network is constructed based on attention in neural networks (ANN). An algorithm of the interaction feature vector between the target vehicle and another vehicle is as follows:

$$\hat{A} = \sum_{j=1}^{M} \beta_j A_j$$

$$A_j = RNN(MLP(a_j))$$

$$\beta_j = \text{softmax}(MLP(A_j))$$

$a_j$ represents a driving feature of any one of the other vehicles relative to the target vehicle, $A_j$ represents a driving feature vector of the any one of the other vehicles relative to the target vehicle that is obtained by extracting features of the driving feature of the any one of the other vehicles relative to the target vehicle by using the MLP and the RNN, $\beta_j$ represents a weighting coefficient obtained by performing normalization classification on the driving feature vector of the any one of the other vehicles relative to the target vehicle by using the attention in neural networks, and $\hat{A}$ represents the interaction feature vector between the target vehicle and the another vehicle.

Because the interaction feature between the target vehicle and the other vehicle may affect prediction of the lane intention of the target vehicle, the computed interaction feature vector between the target vehicle and the other vehicle needs to be used as a consideration factor for the lane intention prediction of the target vehicle.

In addition, to increase accuracy of lane intention prediction, impact of the interaction feature between the target vehicle and a lane and the interaction feature between the target vehicle and a road associated with the lane on lane intention prediction is further considered.

In an example, a lane intention prediction network is constructed, and the interaction feature vector between the target vehicle and the another vehicle, an interaction feature between the target vehicle and each lane, and an interaction feature between the target vehicle and a road associated with each lane are input into the trained lane intention prediction network, to determine a lane intention of the target vehicle and an interaction feature implicit vector between the target vehicle and each lane.

The road associated with each lane may be understood as a road connected by the lane. In other words, the road associated with each lane is a road leading to the lane. For example, in FIG. 6, a road associated with the lane 11 is the road 1, and a road associated with the lane 21 is the road 2.

For example, the interaction feature vector between the target vehicle and the another vehicle, an interaction feature between the target vehicle and the lane 11, and an interaction feature between the target vehicle and the road 1 (namely, a road related to the lane 11) are input into the trained lane intention prediction network, to obtain a probability that the target vehicle drives away from the intersection through the lane 11 and an interaction feature implicit vector between the target vehicle and the lane 11. Likewise, a same method is used to obtain a probability that the target vehicle drives away from the intersection through another lane and an interaction feature implicit vector between the target vehicle and the other lane.

In an example, the lane intention prediction network includes at least a first lane feature extraction subnetwork, a second lane extraction subnetwork, a first road feature extraction subnetwork, a second road feature extraction subnetwork, and a lane intention prediction subnetwork.

The interaction feature between the target vehicle and each lane is input into the first lane feature extraction subnetwork, to extract an interaction feature vector between the target vehicle and each lane; and the interaction feature vector between the target vehicle and each lane is continuously input into the second lane feature extraction subnetwork, to extract an interaction feature implicit vector between the target vehicle and each lane.

The interaction feature between the target vehicle and the road associated with each lane is input into the first road feature extraction subnetwork, to extract an interaction feature vector between the target vehicle and the road associated with each lane; and the interaction feature vector between the target vehicle and the road associated with each lane is input into the second road feature extraction subnetwork, to extract an interaction feature implicit vector between the target vehicle and the road associated with each lane.

The interaction feature vector between the target vehicle and each lane, the interaction feature vector between the target vehicle and each lane, the interaction feature implicit vector between the target vehicle and each lane, and the interaction feature implicit vector between the target vehicle and the road associated with each lane are input into the lane intention prediction subnetwork, to determine the lane intention of the target vehicle.

Figure 9:
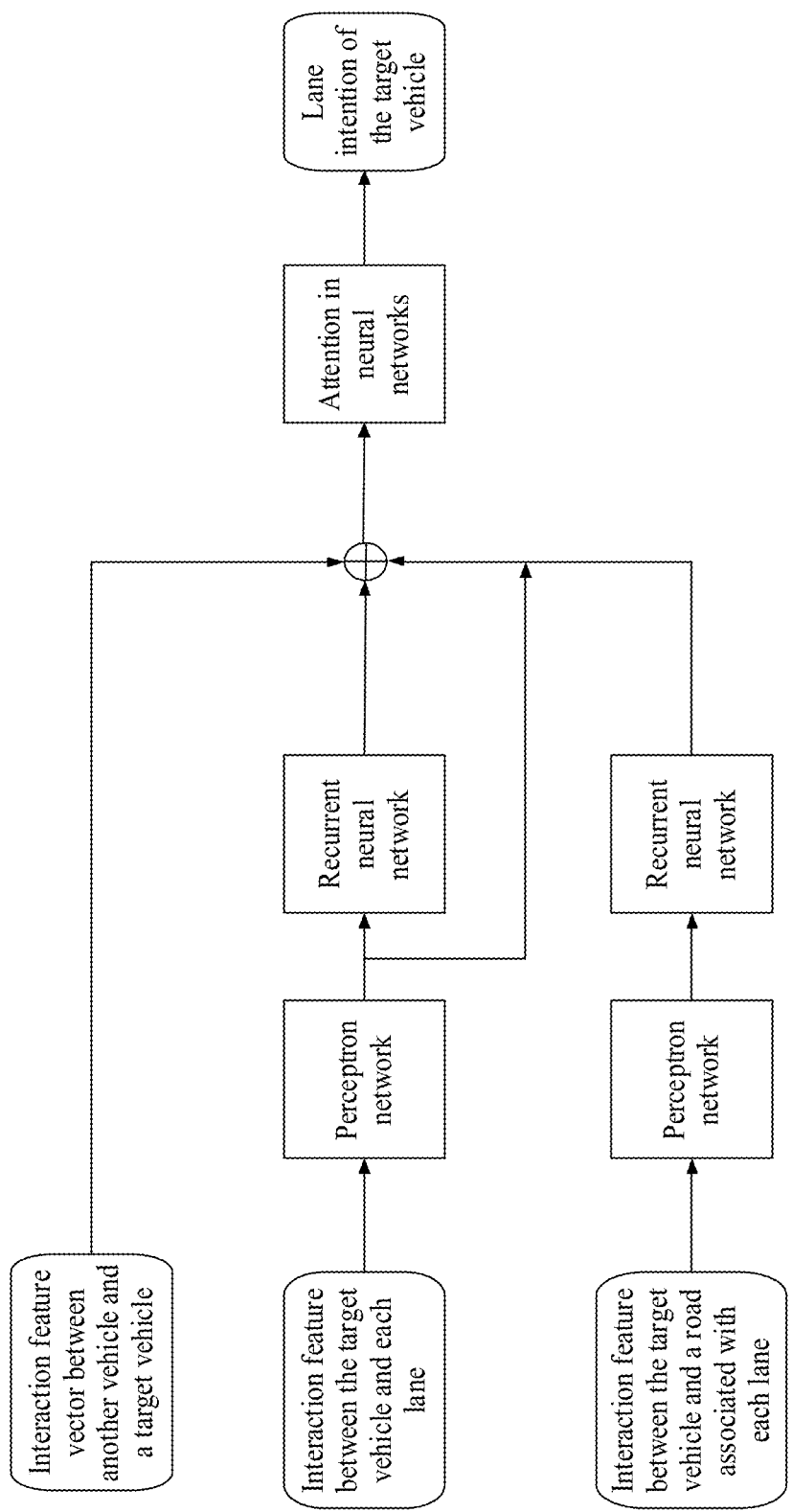
FIG. 9 is a schematic diagram of a structure of a lane intention prediction network of a target vehicle.

In an example, as shown in FIG. 9, both the first lane feature extraction subnetwork and the first road feature extraction subnetwork are constructed based on an MLP, both the second lane feature extraction subnetwork and the second road feature extraction subnetwork are constructed based on an RNN, and the lane intention prediction subnetwork is constructed based on attention in neural networks. An algorithm of predicting the lane intention of the target vehicle is as follows:

$$e_{li}^{t} = MLP(l_i^{t})$$

$$e_{gj}^{t} = MLP(g_j^{t})$$

$$h_{li}^{t} = RNN(h_{li}^{t-1}, e_{li}^{t})$$

$$h_{gj}^{t} = RNN(h_{gj}^{t-1}, e_{gj}^{t})$$

$$\alpha_{ji} = \text{softmax}(MLP([\hat{A}, h_{gj}^{t}, h_{li}^{t}, e_{li}^{t}]))$$

$l_i^t$ represents an interaction feature between the target vehicle at a current moment and an $i^{th}$ lane, $e_{li}^t$ represents an interaction feature vector that is between the target vehicle at the current moment and the $i^{th}$ lane and that is obtained by using the MLP network through extraction on the interaction feature between the target vehicle at the current moment and the $i^{th}$ lane, $h_{li}^{t-1}$ represents an interaction feature implicit vector between the target vehicle at a previous moment and the $i^{th}$ lane, $h_{li}^t$ represents an interaction feature implicit vector between the target vehicle at the current moment and the $i^{th}$ lane, $g_j^t$ represents an interaction feature between the target vehicle at the current moment and a $j^{th}$ road (the $j^{th}$ road is a road associated with the $i^{th}$ lane), $h_{gj}^{t-1}$ represents an interaction feature implicit vector between the target vehicle at the previous moment and the $j^{th}$ road, $h_{gj}^t$ represents an interaction feature implicit vector between the target vehicle at the current moment and the $j^{th}$ road, and $\alpha_{ji}$ represents a probability that the target vehicle drives away from the intersection from the $i^{th}$ lane, namely, a lane intention of the target vehicle corresponding to the $i^{th}$ lane, that is obtained after Â, $h_{gj}^t$, $h_{li}^t$, and $e_{li}^t$ are input to the lane intention prediction subnetwork.

In another example, a road intention prediction network is constructed, and the interaction feature between the target vehicle and each road, an interaction feature implicit vector between the target vehicle and each lane corresponding to the plurality of lanes associated with each road, and the lane intention of the target vehicle corresponding to the lane associated with each road are input into the road intention prediction network, to determine the road intention of the target vehicle.

The lane associated with each road may be understood as a lane connected to each road, namely, a lane leading to the road. For example, in FIG. 6, lanes associated with the road 1 are at least the lane 11 and the lane 12, and lanes associated with the road 2 are at least the lane 21 and the lane 22.

In an example, the road intention prediction network includes at least a first road feature extraction subnetwork, a second road feature extraction subnetwork, and a road intention prediction subnetwork.

The interaction feature between the target vehicle and each road is input into the first road feature extraction subnetwork, to extract an interaction feature vector between the target vehicle and each road.

The interaction feature vector between the target vehicle and each road is input into the second road feature extraction subnetwork, to extract the interaction feature implicit vector between the target vehicle and each road.

Weighted processing is processed, based on a lane intention corresponding to the lane associated with each road, on the interaction feature implicit vector between each lane and all target vehicle corresponding to the lane associated with each road, and weighted processing results are spliced to obtain an implicit fusion vector of the lane associated with each road. For example, there are a total of k lanes associated with a $j^{th}$ road and including a lane 1, a lane 2, . . . , and a lane k. Interaction feature implicit vectors of the lane 1, the lane 2, and the lane k and lane intentions corresponding to the lane 1, the lane 2, and the lane k are obtained from the lane intention network. Weighted processing is performed on the interaction feature implicit vectors of the lane 1, the lane 2, . . . , and the lane k based on the lane intentions corresponding to the lane 1, the lane 2, and the lane k, and weighted processing results are spliced to obtain an implicit fusion vector of the lane associated with the $j^{th}$ road. A method of obtaining an implicit fusion vector of a lane associated with another road is similar.

The interaction feature vector between the target vehicle and each road and the implicit fusion vector of the lane associated with each road are input into the road intention prediction subnetwork, to determine the road intention of the target vehicle.

Figure 10:
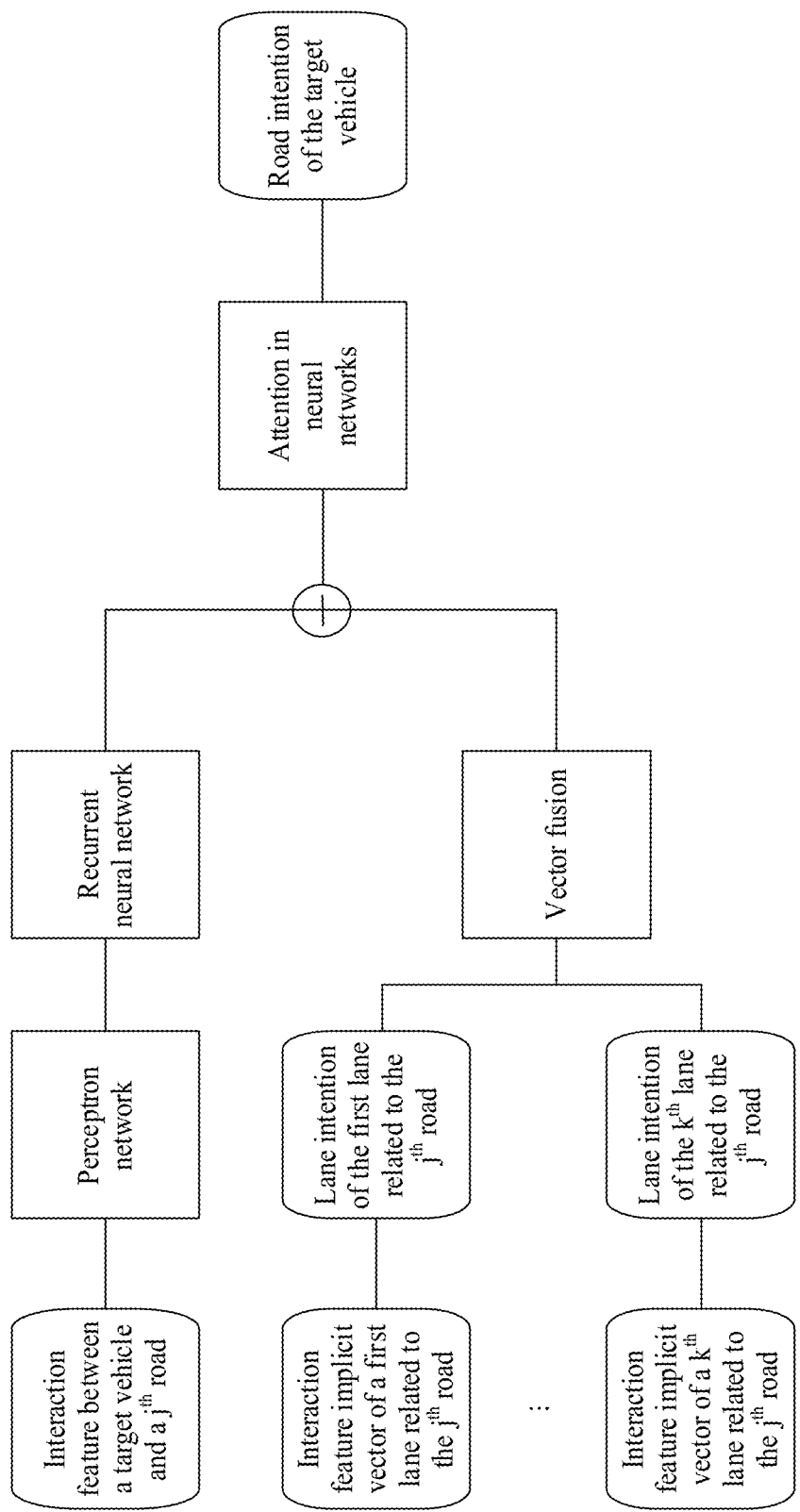
FIG. 10 is a schematic diagram of a structure of a road intention prediction network of a target vehicle.

In an example, as shown in FIG. 10, the first road feature extraction subnetwork is constructed based on an MLP, the second road feature extraction subnetwork is constructed based on an RNN, and the road intention prediction subnetwork is constructed based on attention in neural networks. An algorithm of predicting the road intention of the target vehicle is as follows:

$$\beta_j = \text{softmax}(MLP([h_{gj}^t, P_j^t]))$$

$$P_j^t = \sum_{i=1}^{k_j} \alpha_{ji} h_{li}^t$$

$h_{gj}^t$ represents an interaction feature implicit vector between the target vehicle at a current moment and a $j^{th}$ road, $h_{li}^t$ represents an interaction feature implicit vector between the target vehicle and an $i^{th}$ lane, $\alpha_{ji}$ represents a lane intention of the target vehicle corresponding to the $i^{th}$ lane, $P_j^t$ represents a fusion vector of an interaction feature implicit vector between the $i^{th}$ lane and the target vehicle corresponding to all lanes associated with the $j^{th}$ road, and $\beta_j$ represents a probability that the target vehicle drives away from the intersection from the $j^{th}$ road, namely, the road intention of the target vehicle corresponding to the $j^{th}$ road, that is obtained after $h_{gj}^t$, and $P_j^t$ are input into the road intention prediction subnetwork.

Back to the figure, in step 5, in step S506, the driving intention of the target vehicle is determined based on the road intention of the target vehicle and the lane intention of the target vehicle.

The final driving intention of the target vehicle is determined based on the road intention of the target vehicle and the lane intention of the target vehicle, to represent a future driving track of the target vehicle, namely, a driving track of the target vehicle driving away from the intersection.

Specifically, first, a road corresponding to a maximum probability in the road intentions of the target vehicle is determined as a target road; then, a lane corresponding to a maximum probability in the lane intentions of the target vehicle corresponding to lanes associated with the target road is determined as the target lane; and finally, the driving intention of the target vehicle is determined based on the target road and the target lane. That is, the target lane is used as the driving track of the target vehicle, and the target road is used as a road to which the target vehicle is to drive.

It should be understood that sequence numbers of the foregoing steps do not mean execution sequences. The execution sequences of the steps should be determined based on functions and internal logic of the steps, and should not constitute any limitation on an implementation process of this embodiment of this application. For example, step S502 may be performed before step S501, that is, the map information of the intersection is first obtained, and then the driving information of the target vehicle and the driving information of the surrounding vehicle of the target vehicle are obtained.

In this embodiment of this application, the driving intention of the target vehicle is determined by predicting the lane intention and the road intention of the target vehicle. In one aspect, this can effectively and accurately represent driving behavior of the target vehicle, and can adapt to scenarios of intersections of different structures, thereby avoiding an inaccurate and vague description of the driving behavior of the target vehicle by a predefined fixed-type intention. In another aspect, mutual auxiliary correction of the road intention and the lane intention improves accuracy of the finally predicted driving intention of the target vehicle.

A target model in this application includes a first interaction feature extraction network, the lane intention prediction network, and the road prediction network, and the first interaction feature extraction network, the lane intention prediction network, and the road prediction network are trained based on a large amount of training sample data. For example, the training data may include detected current driving information and map information of an intersection corresponding to the target vehicle and the other vehicle, and driving information of the target vehicle after a preset time period. The input current driving information and map information of the intersection corresponding to the target vehicle and the another vehicle are processed, and an output driving intention of the target vehicle is compared with actual driving information of the target vehicle after the preset time period, until a difference between the output driving intention of the target vehicle and the actual driving information of the target vehicle is less than a specific threshold, so as to complete training of the target model. The target model is obtained through training based on the training data. The target model may be used to predict the driving intention of the vehicle based on the current driving information and the map information of the intersection corresponding to the target vehicle and the other vehicle.

Alternatively, when a preset quantity of training times is reached, it is determined that training of the target model is completed. For example, the MLP in the target model is a single-layer fully connected network, a hidden unit dimension is 64, and an activation function is Relu. The RNN in the target model uses a gated recurrent units (GRU), and a hidden unit dimension is 128. In an attention mechanism module, a dimension of an MLP hidden unit for computing a weight coefficient is 1, and a normalized target intention probability is obtained after softmax. An open-source deep learning framework is used to implement the high-order intention prediction network on the vehicle. The network is trained in a multi-task learning mode. A loss function includes a road-level intention cross entropy and a lane-level intention cross entropy. A batch size of the training data is 512, an initial learning rate is 0.001, a learning rate changes in an exponential descending manner, an attenuation step is set to 10 rounds, and a total quantity of training rounds is 50. One round of training indicates that all training data is traversed once.

Figure 11:
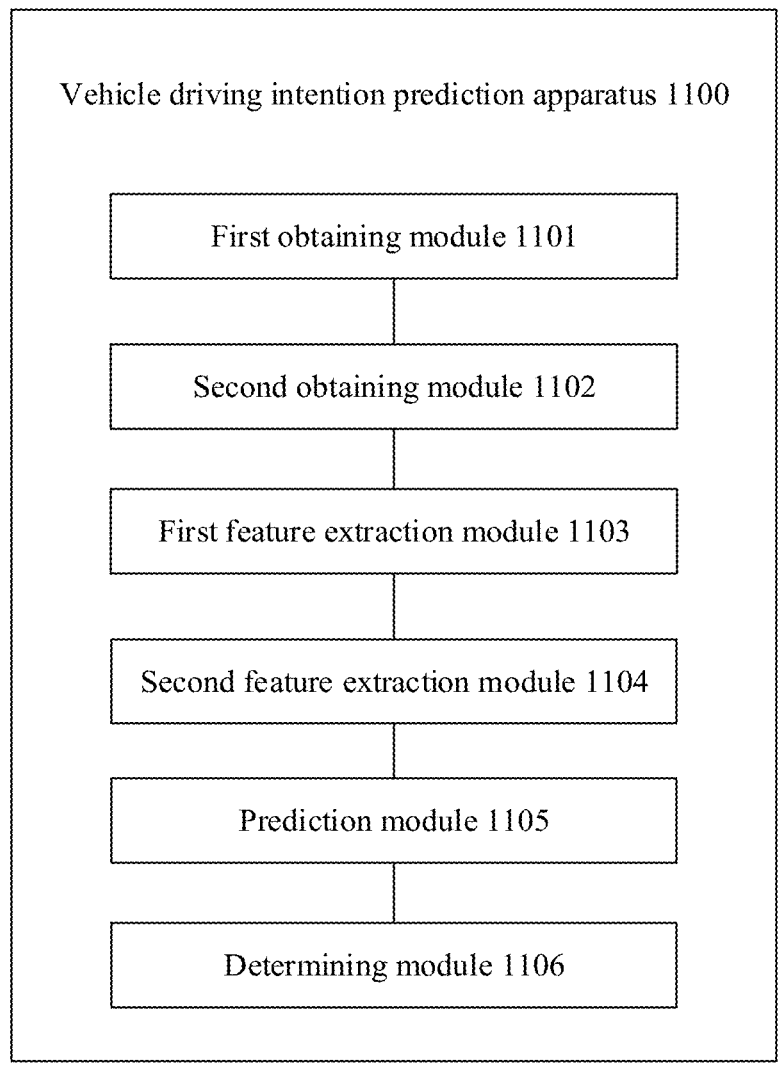
FIG. 11 is a schematic diagram of a structure of a vehicle driving intention prediction apparatus according to an embodiment of this application.

FIG. 11 is a schematic diagram of a structure of a vehicle driving intention prediction apparatus according to an embodiment of this application. As shown in FIG. 11, the vehicle driving intention prediction apparatus 1100 includes at least a first obtaining module 1101 configured to when a target vehicle drives to an intersection, obtain map information of the intersection, where the map information of the intersection includes road layer information and lane layer information, the road layer information includes a plurality of roads connected to the intersection, the lane layer information includes a plurality of lanes, and the lanes are some segments connected to the roads in the intersection; a second obtaining module 1102 configured to obtain driving information of the target vehicle; a first feature extraction module 1103 configured to determine a driving feature of the target vehicle relative to each lane based on the driving information of the target vehicle and the lane layer information; a second feature extraction module 1104 configured to determine a driving feature of the target vehicle relative to each road based on the driving information of the target vehicle and the road layer information; a prediction module 1105 configured to determine a road intention of the target vehicle and a lane intention of the target vehicle based on the driving feature of each of surrounding vehicles relative to the target vehicle, the driving feature of the target vehicle relative to each road, and the driving feature of the target vehicle relative to each lane, where the surrounding vehicle is a vehicle within a preset range of the target vehicle, the road intention of the target vehicle represents a probability distribution that the target vehicle drives away from the intersection through each road, and the lane intention of the target vehicle represents a probability distribution that the target vehicle drives away from the intersection through each lane; and a determining module 1106 configured to determine a driving intention of the target vehicle based on the road intention of the target vehicle and the lane intention of the target vehicle.

In a possible implementation, the prediction module 1105 is further configured to input a driving feature of each of the surrounding vehicles relative to the target vehicle into a first interaction feature extraction network, to determine an interaction feature vector between the surrounding vehicle and the target vehicle, where the interaction feature vector between the surrounding vehicle and the target vehicle represents impact of the surrounding vehicle on the target vehicle; input the interaction feature vector between the surrounding vehicle and the target vehicle, the driving feature of the target vehicle relative to each lane, and the driving feature of the target vehicle relative to a road associated with each lane into a lane intention prediction network, to determine the lane intention of the target vehicle and a driving feature implicit vector of the target vehicle relative to each lane; and input the driving feature of the target vehicle relative to each road, the driving feature implicit vector that is of the target vehicle relative to each lane and that corresponds to the plurality of lanes associated with each road, and the lane intention, of the target vehicle, corresponding to a lane associated with each road into a road intention prediction network, to determine the road intention of the target vehicle.

In another possible implementation, the first interaction feature extraction network includes at least a plurality of first feature extraction subnetworks and an interaction feature vector prediction network; and the inputting a driving feature of each of the surrounding vehicles relative to the target vehicle into a first interaction feature extraction network, to determine an interaction feature vector between the surrounding vehicle and the target vehicle includes: inputting the driving feature of each of the surrounding vehicles relative to the target vehicle into the plurality of first feature extraction subnetworks, to determine a driving feature vector of each of the surrounding vehicles relative to the target vehicle; and inputting the driving feature vector of each of the surrounding vehicles relative to the target vehicle into the interaction feature vector prediction network, to determine the interaction feature vector between the surrounding vehicle and the target vehicle.

In another possible implementation, the lane intention prediction network includes at least a first lane feature extraction subnetwork, a second lane feature extraction subnetwork, a first road feature extraction subnetwork, a second road feature extraction subnetwork, and a lane intention prediction subnetwork; and the inputting the interaction feature vector between the surrounding vehicle and the target vehicle, the driving feature of the target vehicle relative to each lane, and the driving feature of the target vehicle relative to a road associated with each lane into a lane intention prediction network, to determine the lane intention of the target vehicle and a driving feature implicit vector of the target vehicle relative to each lane includes: inputting the driving feature of the target vehicle relative to each lane into the first lane feature extraction subnetwork, to determine a driving feature vector of the target vehicle relative to each lane; inputting the driving feature vector of the target vehicle relative to each lane into the second lane feature extraction subnetwork, to determine the driving feature implicit vector of the target vehicle relative to each lane; inputting the driving feature of the target vehicle relative to the road associated with each lane into the first road feature extraction subnetwork, to determine a driving feature vector of the target vehicle relative to the road associated with each lane; inputting the driving feature vector of the target vehicle relative to the road associated with each lane into the second road feature extraction subnetwork, to determine a driving feature implicit vector of the target vehicle relative to the road associated with each lane; and inputting the interaction feature vector between the surrounding vehicle and the target vehicle, the driving feature vector of the target vehicle relative to each lane, the driving feature implicit vector of the target vehicle relative to each lane, and the driving feature implicit vector of the target vehicle relative to the road associated with each lane into the lane intention prediction subnetwork, to determine the lane intention of the target vehicle.

In another possible implementation, the inputting the driving feature vector of the target vehicle relative to each lane into the second lane feature extraction subnetwork, to determine the driving feature implicit vector of the target vehicle relative to each lane includes extracting, by a plurality of feature extraction windows in the second lane feature extraction subnetwork, the driving feature vector of the target vehicle relative to each lane in an order of driving moments; and determining the driving feature implicit vector of the target vehicle relative to each lane based on a driving feature vector that is of the target vehicle relative to each lane and that corresponds to a current feature extraction window and an implicit vector output by a previous feature extraction window.

In another possible implementation, the inputting the driving feature vector of the target vehicle relative to the road associated with each lane into the second road feature extraction subnetwork, to determine a driving feature implicit vector of the target vehicle relative to the road associated with each lane includes extracting, by a plurality of feature extraction windows in the second road feature extraction subnetwork, the driving feature vector of the target vehicle relative to the road associated with each lane in an order of driving moments; and determining the driving feature implicit vector of the target vehicle relative to the road associated to each lane based on a driving feature vector that is of the target vehicle relative to the road associated to each lane and that corresponds to a current feature extraction window and an implicit vector output by a previous feature extraction window.

In another possible implementation, the road intention prediction network includes at least the first road feature extraction subnetwork, the second road feature extraction subnetwork, and a road intention prediction subnetwork; and the inputting the driving feature of the target vehicle relative to each road, the driving feature implicit vector that is of the target vehicle relative to each lane and that corresponds to the plurality of lanes associated with each road, and the lane intention, of the target vehicle, corresponding to a lane associated with each road into a road intention prediction network, to determine the road intention of the target vehicle includes: inputting the driving feature of the target vehicle relative to each road into the first road feature extraction subnetwork, to determine a driving feature vector of the target vehicle relative to each road; inputting the driving feature vector of the target vehicle relative to each road into the second road feature extraction subnetwork, to determine a driving feature implicit vector of the target vehicle relative to each road; and performing, based on the lane intention corresponding to the lane associated with each road, weighted processing on the driving feature implicit vector that is of the target vehicle relative to each lane and that corresponds to the lane associated with each road, and splicing weighted processing results, to obtain an implicit fusion vector of the lane associated with each road; and inputting the driving feature vector of the target vehicle relative to each road and the implicit fusion vector of the lane associated with each road into the road intention prediction subnetwork, to determine the road intention of the target vehicle.

In another possible implementation, the first feature extraction subnetwork is constructed based on at least a multi-layer perceptron network and a recurrent neural network; the first lane feature extraction subnetwork and the first road feature extraction subnetwork are constructed based on at least the multi-layer perceptron network, and the second lane feature extraction subnetwork and the second road feature extraction subnetwork are constructed based on at least the recurrent neural network; and the interaction feature vector prediction network, the lane intention prediction subnetwork, and the road intention prediction subnetwork are all constructed based on at least attention in neural networks.

In another possible implementation, the determining module 1106 is further configured to determine a road corresponding to a maximum probability in the road intention of the target vehicle as a target road; determine a lane corresponding to a maximum probability in the lane intention of the target vehicle corresponding to a lane associated with the target road as a target lane; and determine the driving intention of the target vehicle based on the target road and the target lane.

In another possible implementation, the driving feature of each of the surrounding vehicles relative to the target vehicle includes one or more of a location feature of each of the surrounding vehicles in a first coordinate system, a speed feature, and a head orientation feature, where an origin of the first coordinate system is a current location of the target vehicle, the first coordinate system is a rectangular coordinate system, a y-axis of the first coordinate system is parallel to a length direction of a vehicle body of the target vehicle, and a forward direction of the y-axis is consistent with a head orientation of the target vehicle.

In another possible implementation, the driving feature of the target vehicle relative to each road includes one or more of a location feature of the target vehicle in each second coordinate system, a distance feature between the target vehicle and an origin, a head orientation feature of the target vehicle, and a feature that a location of the target vehicle in each second coordinate system, a distance between the target vehicle and the origin, and the head orientation of the target vehicle change with a driving moment, where each second coordinate system is a rectangular coordinate system, the origin of each second coordinate system is determined based on an exit location of each road, and an x-axis direction is determined based on a driving direction of each road.

In another possible implementation, the driving feature of the target vehicle relative to each lane includes one or more of a location feature of the target vehicle in each third coordinate system, a feature of an angle formed by the head orientation of the target vehicle and a driving direction of the lane, and a feature that a location of the target vehicle in each third coordinate system, and the angle formed by the head orientation of the target vehicle and the driving direction of the lane change with the driving moment, where each third coordinate system is a frenet coordinate system, a reference line of each third coordinate system is determined based on a center line of each lane, and an origin of each third coordinate system is determined based on an end point of the center line of each lane.

In another possible implementation, each lane is determined based on topology analysis performed on the plurality of roads.

The vehicle driving intention prediction apparatus 1100 according to this embodiment of this application may correspondingly perform the method described in embodiments of this application, and the foregoing and other operations and/or functions of each module in the vehicle driving intention prediction apparatus 1100 are separately used to implement corresponding procedures of the methods in FIG. 4 to FIG. 10. For brevity, details are not described herein again.

In addition, it should be noted that the foregoing described embodiments are merely examples. The modules described as separate parts may or may not be physically separate, and parts displayed as modules may or may not be physical modules, that is, may be located in one place, or may be distributed to a plurality of network modules. Some or all of the modules may be selected based on actual requirements to achieve the objectives of the solutions of embodiments. In addition, in the accompanying drawings of the device embodiment provided in this application, a connection relationship between modules indicates that there is a communication connection between the modules, and may be specifically implemented as one or more communication buses or signal cables.

This application further provides a vehicle driving intention prediction terminal, including a memory and a processor. The memory stores executable code, and the processor executes the executable code to implement any one of the foregoing methods.

It may be understood that the vehicle driving intention prediction terminal may be a vehicle-mounted terminal with a vehicle driving intention prediction function, or may be a vehicle with a vehicle driving intention prediction function.

This application further provides a computer-readable storage medium. The computer-readable storage medium stores a computer program, and when the computer program is executed on a computer, the computer is enabled to implement any one of the foregoing methods.

This application further provides a computer program or a computer program product. The computer program or the computer program product includes instructions. When the instructions are executed, a computer is enabled to perform any one of the foregoing methods.

This application further provides an electronic device, including a memory and a processor. The memory stores executable code, and the processor executes the executable code to implement any one of the foregoing methods.

A person of ordinary skill in the art should be aware that units and algorithm steps in the examples described with reference to embodiments disclosed in this specification can be implemented by electronic hardware, computer software, or a combination of computer software and electronic hardware. To clearly illustrate interchangeability of hardware and software, various illustrative components and steps have been described above generally in terms of functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

A person of ordinary skill in the art may understand that all or a part of the steps in each of the foregoing method of embodiments may be implemented by a program instructing a processor. The foregoing program may be stored in a computer-readable storage medium. The storage medium may be a non-transitory medium, for example may be a random-access memory, a read-only memory, a flash memory, a hard disk, a solid-state drive, a magnetic tape, a floppy disk, an optical disc, or any combination thereof.

The foregoing descriptions are merely preferable specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
    obtaining map information of an intersection when a target vehicle drives to the intersection, wherein the map information of the intersection comprises road layer information and lane layer information, wherein the road layer information is of roads connected to the intersection, and wherein the lane layer information is of lanes of the roads;
    obtaining driving information of the target vehicle;
    determining a first driving feature of the target vehicle relative to each of the lanes based on the driving information and the lane layer information;
    determining a second driving feature of the target vehicle relative to each of the roads based on the driving information and the road layer information;
    determining a lane intention of the target vehicle based on a third driving feature of a surrounding vehicle relative to the target vehicle, the first driving feature, and the second driving feature, wherein the surrounding vehicle is in a preset range of the target vehicle, and wherein the lane intention represents a first probability distribution that the target vehicle drives away from the intersection through each of the lanes;
    determining a driving intention of the target vehicle based on the lane intention; and
    controlling, by a control system of the target vehicle, the target vehicle to drive on a planned driving route determined based on the driving intention.

2. The method of claim 1, wherein determining the lane intention comprises determining a road intention of the target vehicle and the lane intention based on the first driving feature, the second driving feature, and the third driving feature, wherein the road intention represents a second probability distribution that the target vehicle drives away from the intersection through each of the roads, and wherein determining the driving intention comprises determining the driving intention based on the road intention and the lane intention.

3. The method of claim 2, wherein determining the road intention comprises:
inputting a fourth driving feature of the surrounding vehicle into a first interaction feature extraction network to determine an interaction feature vector between the surrounding vehicle and the target vehicle, wherein the interaction feature vector represents an impact of the surrounding vehicle on the target vehicle;
inputting the interaction feature vector, the first driving feature, and a fifth driving feature of the target vehicle relative to a road associated with each of the plurality of lanes into a lane intention prediction network to determine the lane intention and a first driving feature implicit vector of the target vehicle relative to each of the lanes; and
inputting the second driving feature, the first driving feature implicit vector that is of the target vehicle relative to each of the lanes and that corresponds to the lanes associated with each of the roads, and the lane intention corresponding to a lane associated with each of the roads into a road intention prediction network to determine the road intention.

4. The method of claim 3, wherein the first interaction feature extraction network comprises a plurality of first feature extraction subnetworks and an interaction feature vector prediction network, and wherein inputting the fourth driving feature comprises:
inputting the fourth driving feature into the first feature extraction subnetworks to determine a first driving feature vector of the surrounding vehicle; and
inputting the first driving feature vector into the interaction feature vector prediction network to determine the interaction feature vector.

5. The method of claim 3, wherein the lane intention prediction network comprises a first lane feature extraction subnetwork, a second lane feature extraction subnetwork, a first road feature extraction subnetwork, a second road feature extraction subnetwork, and a lane intention prediction subnetwork, and wherein inputting the interaction feature vector, the first driving feature, and the fifth driving feature into the lane intention prediction network comprises:
inputting the first driving feature into the first lane feature extraction subnetwork to determine a second driving feature vector of the target vehicle relative to each of the lanes;
inputting the second driving feature vector into the second lane feature extraction subnetwork to determine the first driving feature implicit vector;
inputting the fifth driving feature into the first road feature extraction subnetwork to determine a third driving feature vector of the target vehicle relative to the road associated with each of the lanes;
inputting the third driving feature vector into the second road feature extraction subnetwork to determine a second driving feature implicit vector of the target vehicle relative to the road associated with each of the lanes; and
inputting the interaction feature vector, the second driving feature vector, the first driving feature implicit vector, and the second driving feature implicit vector into the lane intention prediction subnetwork to determine the lane intention.

6. The method of claim 5, wherein inputting the second driving feature vector comprises:
extracting, by a plurality of feature extraction windows in the second lane feature extraction subnetwork, the second driving feature vector in an order of driving moments; and
determining the first driving feature implicit vector based on an implicit vector output by a previous feature extraction window and a fourth driving feature vector that is of the target vehicle relative to each of the lanes and that corresponds to a current feature extraction window.

7. The method of claim 5, wherein inputting the third driving feature vector comprises:
extracting, by a plurality of feature extraction windows in the second road feature extraction subnetwork, the third driving feature vector in an order of driving moments; and
determining the second driving feature implicit vector based on an implicit vector output by a previous feature extraction window and a fifth driving feature vector that is of the target vehicle relative to the road associated to each of the lanes and that corresponds to a current feature extraction window.

8. The method of claim 5, wherein the road intention prediction network comprises the first road feature extraction subnetwork, the second road feature extraction subnetwork, and a road intention prediction subnetwork, and wherein inputting the second driving feature, the first driving feature implicit vector, and the lane intention into the road intention prediction network comprises:
inputting the second driving feature into the first road feature extraction subnetwork to determine a sixth driving feature vector of the target vehicle relative to each of the roads;
inputting the sixth driving feature vector into the second road feature extraction subnetwork to determine a third driving feature implicit vector of the target vehicle relative to each of the roads;
performing, based on the lane intention corresponding to the lane, weighted processing on the first driving feature implicit vector;
splicing weighted processing results to obtain an implicit fusion vector of the lane; and
inputting the second driving feature vector and the implicit fusion vector of the lane into the road intention prediction subnetwork to determine the road intention.

9. The method of claim 8, wherein the first road feature extraction subnetwork is based on at least a multi-layer perceptron network and a recurrent neural network, wherein the first lane feature extraction subnetwork and the first road feature extraction subnetwork are based on at least the multi-layer perceptron network, wherein the second lane feature extraction subnetwork and the second road feature extraction subnetwork are based on at least the recurrent neural network, and wherein an interaction feature vector prediction network, the lane intention prediction subnetwork, and the road intention prediction subnetwork are all based on at least attention in neural networks.

10. The method of claim 2, wherein determining the driving intention comprises:
determining a road corresponding to a maximum probability in the road intention as a target road;
determining a lane corresponding to a maximum probability in the lane intention corresponding to a lane associated with the target road as a target lane; and determining the driving intention based on the target road and the target lane.

11. The method of claim 1, wherein the third driving feature comprises one or more of a location feature of the surrounding vehicle in a first coordinate system, a speed feature, or a head orientation feature, wherein an origin of the first coordinate system is a current location of the target vehicle, wherein the first coordinate system is a rectangular coordinate system, wherein a y-axis of the first coordinate system is parallel to a length direction of a vehicle body of the target vehicle, and wherein a forward direction of the y-axis is consistent with a head orientation of the target vehicle.

12. The method of claim 1, wherein the second driving feature comprises one or more of a location feature of the target vehicle in a second coordinate system, a distance feature between the target vehicle and an origin, a head orientation feature of the target vehicle, or a feature including that a location of the target vehicle in the second coordinate system, a distance between the target vehicle and the origin, and a head orientation of the target vehicle change with a driving moment, wherein the second coordinate system is a rectangular coordinate system, wherein an origin of the second coordinate system is based on an exit location of each of the roads, and wherein an x-axis direction is based on a driving direction of each of the roads.

13. The method of claim 1, wherein the first driving feature comprises one or more of a location feature of the target vehicle in a third coordinate system, a first feature of an angle formed by a head orientation of the target vehicle and a driving direction of a lane, or a second feature including that a location of the target vehicle in the third coordinate system and the angle change with a driving moment, wherein the third coordinate system is a frenet coordinate system, wherein a reference line of the third coordinate system is based on a center line of each of the lanes, and wherein an origin of the third coordinate system is based on an end point of the center line.

14. The method of claim 1, further comprising determining the lanes based on a topology analysis on the roads.

15. An apparatus comprising:
a memory configured to store instructions; and
at least one processor coupled to the memory and configured to:
obtain map information of an intersection when a target vehicle drives to the intersection, wherein the map information of the intersection comprises road layer information and lane layer information, wherein the road layer information is of roads connected to the intersection, and wherein the lane layer information is of lanes of the roads;
obtain driving information of the target vehicle;
determine a first driving feature of the target vehicle relative to each of the lanes based on the driving information and the lane layer information;
determine a second driving feature of the target vehicle relative to each of the roads based on the driving information and the road layer information;
determine a lane intention of the target vehicle based on a third driving feature of a surrounding vehicle relative to the target vehicle, the first driving feature, and the second driving feature, wherein the surrounding vehicle is in a preset range of the target vehicle, and wherein the lane intention represents a first probability distribution that the target vehicle drives away from the intersection through each of the plurality of lanes;
determine a driving intention of the target vehicle based on the lane intention; and
control, by a control system of the target vehicle, the target vehicle to drive on a planned driving route determined based on the driving intention.

16. The apparatus of claim 15, wherein the at least one processor is further configured to:
determine a road intention of the target vehicle and the lane intention based on the first driving feature, the second driving feature, and the third driving feature, wherein the road intention of the target vehicle represents a second probability distribution that the target vehicle drives away from the intersection through each of the roads; and
determine the driving intention based on the road intention and the lane intention.

17. The apparatus of claim 16, wherein the at least one processor is further configured to:
input a fourth driving feature of the surrounding vehicle into a first interaction feature extraction network to determine an interaction feature vector between the surrounding vehicle and the target vehicle, wherein the interaction feature vector represents an impact of the surrounding vehicle on the target vehicle;
input the interaction feature vector, the first driving feature, and a fifth driving feature of the target vehicle relative to a road associated with each of the lanes into a lane intention prediction network to determine the lane intention and a first driving feature implicit vector of the target vehicle relative to each of the lanes; and
input the second driving feature, the first driving feature implicit vector that is of the target vehicle relative to each of the plurality of lanes and that corresponds to the lanes associated with each of the roads, and the lane intention corresponding to a lane associated with each of the roads into a road intention prediction network to determine the road intention.

18. The apparatus of claim 17, wherein the first interaction feature extraction network comprises a plurality of first feature extraction subnetworks and an interaction feature vector prediction network, and wherein the at least one processor is further configured to:
input the fourth driving feature into the first feature extraction subnetworks to determine a first driving feature vector of the surrounding vehicle; and
input the first driving feature vector into the interaction feature vector prediction network to determine the interaction feature vector.

19. The apparatus of claim 17, wherein the lane intention prediction network comprises a first lane feature extraction subnetwork, a second lane feature extraction subnetwork, a first road feature extraction subnetwork, a second road feature extraction subnetwork, and a lane intention prediction subnetwork, and wherein the at least one processor is further configured to:
input the first driving feature into the first lane feature extraction subnetwork to determine a second driving feature vector of the target vehicle relative to each of the lanes;
input the second driving feature vector into the second lane feature extraction subnetwork to determine the first driving feature implicit vector;
input the fifth driving feature into the first road feature extraction subnetwork to determine a third driving feature vector of the target vehicle relative to the road;
input the third driving feature vector into the second road feature extraction subnetwork to determine a second driving feature implicit vector of the target vehicle relative to the road associated with each of the lanes; and input the interaction feature vector, the second driving feature vector, the first driving feature implicit vector, and the second driving feature implicit vector into the lane intention prediction subnetwork to determine the lane intention.

20. A computer program product comprising computer-executable instructions stored on a non-transitory computer-readable storage medium that, when executed by a processor, cause an apparatus to:

obtain map information of an intersection when a target vehicle drives to the intersection, wherein the map information of the intersection comprises road layer information and lane layer information, wherein the road layer information is of roads connected to the intersection, and wherein the lane layer information is of lanes of the roads;

obtain driving information of the target vehicle;

determine a first driving feature of the target vehicle relative to each of the lanes based on the driving information and the lane layer information;

determine a second driving feature of the target vehicle relative to each of the roads based on the driving information and the road layer information;

determine a lane intention of the target vehicle based on a third driving feature of a surrounding vehicle relative to the target vehicle, the first driving feature, and the second driving feature, wherein the surrounding vehicle is in a preset range of the target vehicle, and wherein the lane intention represents a probability distribution that the target vehicle drives away from the intersection through each of the plurality of lanes;

determine a driving intention of the target vehicle based on the lane intention; and control, by a control system of the target vehicle, the target vehicle to drive on a planned driving route determined based on the driving intention.

* * * * *